(12) United States Patent
Kato et al.

(10) Patent No.: US 7,060,385 B2
(45) Date of Patent: Jun. 13, 2006

(54) NOBLE METAL-BASE METAL ALLOY CATALYST, EVALUATION OF SUCH CATALYST, AND METHOD OF PRODUCING SUCH CATALYST

(75) Inventors: Hisao Kato, Nisshin (JP); Takahiko Asaoka, Aichi-ken (JP); Kazutaka Hiroshima, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 142 days.

(21) Appl. No.: 10/206,036

(22) Filed: Jul. 29, 2002

(65) Prior Publication Data
US 2003/0044655 A1    Mar. 6, 2003

(30) Foreign Application Priority Data
Aug. 3, 2001 (JP) ............... 2001-235958

(51) Int. Cl.
*H01M 4/96* (2006.01)
*B01J 23/89* (2006.01)

(52) U.S. Cl. .............. 429/44; 502/185; 502/326
(58) Field of Classification Search ............ 429/40, 429/41, 42, 43, 44; 502/185, 325, 326, 327, 502/339
See application file for complete search history.

(56) References Cited

U.S. PATENT DOCUMENTS

| | | | |
|---|---|---|---|
| 4,082,699 A | | 4/1978 | Petrow et al. ............ 502/325 |
| 5,096,866 A | * | 3/1992 | Itoh et al. ............ 502/184 X |
| 5,225,391 A | * | 7/1993 | Stonehart et al. ......... 429/44 X |
| 5,856,036 A | * | 1/1999 | Smotkin et al. ............ 429/40 |
| 6,165,635 A | * | 12/2000 | Auer et al. ............... 429/40 |

FOREIGN PATENT DOCUMENTS

| | | |
|---|---|---|
| EP | A1 0 129 399 | 12/1984 |
| EP | A1 0 330 627 | 8/1989 |
| EP | B1 0 355 853 | 2/1990 |
| JP | A 3-68452 | 3/1991 |
| JP | A 6-7679 | 1/1994 |
| JP | B2 7-63627 | 7/1995 |
| JP | 9-161811 * | 6/1997 |
| JP | 10-32010 * | 2/1998 |
| JP | A 2001-216991 | 8/2001 |
| WO | WO 00/37718 | 6/2000 |

* cited by examiner

*Primary Examiner*—Stephen J. Kalafut
(74) *Attorney, Agent, or Firm*—Oliff & Berridge PLC

(57) ABSTRACT

The technique of the present invention attains simple and accurate evaluation of the performance of a fuel cell and enables produce of a high-performance electrode catalyst and a high-performance fuel cell. The procedure makes platinum, a noble metal, and iron, a base metal, carried on carbon having a large specific surface area, and heats up the carbon with platinum and iron to a specific temperature to reduce iron. A resulting platinum-iron alloy electrode catalyst exerts excellent catalytic functions. A fuel cell using this electrode catalyst has a high IR compensation voltage. The quantity of carbon monoxide adsorbed by this novel electrode catalyst is not less than 14 Ncc per one gram of platinum. The atomic number ratio of iron (Fe) to platinum (Pt) in the catalyst is not lower than 0.14 by EDX analysis, and the ratio of the binding number of Pt atom with Fe atom to the total binding number relating to Pt atom is not lower than 0.10 by EXAFS analysis. Each electrode catalyst produced is evaluated by measurement of these data. The fuel cell including the electrode catalyst having the favorable result of evaluation ensures the desired performances.

7 Claims, 13 Drawing Sheets

- ●— CARBON HAVING SPECIFIC SURFACE AREA OF 1000 m²/g
- □— CARBON HAVING SPECIFIC SURFACE AREA OF 256 m²/g
- △— CARBON HAVING SPECIFIC SURFACE AREA OF 84 m²/g

NOBLE METAL-BASE METAL ALLOY CATALYST, EVALUATION OF SUCH CATALYST, AND METHOD OF PRODUCING SUCH CATALYST

BACKGROUND OF THE INVENTION

1. Field of the Invention

The present invention relates to a technique of evaluating an electrode catalyst fixed to an electrode of a fuel cell, a technique of evaluating the performance of a fuel cell, an electrode catalyst evaluated by the evaluation technique, a method of producing an electrode catalyst, a fuel cell with an electrode catalyst, and a method of manufacturing a fuel cell.

2. Description of the Related Art

The performance of the electrode catalyst is one important factor affecting the performance of the fuel cell. Lots of techniques of evaluating the function of the electrode catalyst have been proposed to evaluate the performance of the fuel cell. One known evaluation technique of the electrode catalyst discharges a manufactured fuel cell and measures the output potential of the fuel cell. Another known evaluation technique utilizes cyclic voltammetry (CV method), which soaks the electrode catalyst in an electrolytic solution and sweeps the potential to measure the electric current. These prior art techniques of evaluating the electrode catalyst adopt the electrochemical method that supplies electricity to the electrode catalyst.

The fuel cell under the vigorous research and development is a laminate of multiple unit cells. Each unit cell is formed by interposing a membrane-electrode assembly (MEA) between a pair of separators. For the desired performance of the fuel cell, each MEA of the cell laminate is required to have the performance of or over a specific level. Evaluation of the electrode catalyst after manufacture of the fuel cell should accordingly be carried out by the unit of MEA. Since the output voltage of each MEA is feeble, meticulous attention is required to prevent adhesion of metal ions. Evaluation of the electrode catalyst accordingly takes significant process and time. Another problem is that manufacture of the MEA is essential for evaluation of the electrode catalyst. Manufacture of the MEA takes time and labor and has difficulty in regulation for the desired properties.

In general, the electrode catalyst for the fuel cell includes a noble metal, for example, platinum, carried on a carbon carrier and is fixed with an electrolyte binder to the electrolyte membrane to form the MEA. Carbon typically has the particle diameter of about 20 to 100 nm, and primary particles of carbon are aggregated to form agglomerate. Platinum, on the other hand, has the particle diameter of about 2 to 3 nm, and the electrolyte binder has the particle diameter greater than the space between adjoining primary particles of carbon. The electrolyte binder can thus not enter the space between the adjoining primary particles of carbon. Part of platinum accordingly does not contribute to the catalytic reaction. In the CV method that soaks the electrode catalyst in an electrolytic solution for measurement of the electric current, the particle diameter of the electrolyte solution is smaller than the space between the adjoining primary particles of carbon. Platinum that is not in contact with the electrolyte binder (that is, platinum that has no contribution to the catalytic reaction) is accordingly exposed to the electrolytic solution. This results in evaluation of the performance of the electrode catalyst including the platinum having no contribution to the catalytic reaction. Namely the evaluated performance of the electrode catalyst (evaluated performance of the fuel cell) may be inaccurate.

The properties of the fuel cell including the electrode catalyst can not be expected at the stage prior to production of the electrode. There is accordingly difficulties in manufacture of the high-performance fuel cell. A large variation in performance among the respective unit cells results in poor properties of a resulting fuel cell stack obtained by laminating multiple unit cells. In order to give the high-performance fuel cell stack, the performance of each unit cell should be evaluated prior to stacking. This lowers the production efficiency.

Such problems are not restrictive in the platinum catalyst or the alloy catalyst, but are common to manufacture of the fuel cell including any electrode catalyst. A platinum-iron alloy catalyst is a known example of the alloy catalyst (see JAPANESE PATENT LAID-OPEN GAZETTE No. 3-68452, for example). No practical techniques have been proposed to simplify and improve evaluation of the performance of such alloy catalysts.

SUMMARY OF THE INVENTION

The object of the present invention is thus to provide an evaluation technique that attains simple and accurate evaluation of the performance of a fuel cell.

The object of the invention is also to provide a producing technique that enables production of a high-performance electrode catalyst and a high-performance fuel cell by taking advantage of the evaluation technique.

In order to attain at least part of the above and the other related objects, the present invention is directed to a production method of an electrode catalyst used for a fuel cell. The production method includes: a noble metal supporting step that makes a noble metal carried at a predetermined support density on a carbon carrier having a specific surface area of not smaller than a predetermined value; a base metal supporting step that makes a base metal carried at a specified support density on the carbon carrier with the noble metal carried thereon; a heating step that heats the carbon carrier with the noble metal and the base metal carried thereon to a specific temperature that allows reduction of the base metal carried on the carbon carrier; and an alloying step that further heats up the carbon carrier with the noble metal and the base metal after the reduction of the base metal at the specific temperature, so as to alloy the noble metal and the base metal on the carbon carrier.

There is an apparatus for producing an electrode catalyst corresponding to the production method.

The present invention is accordingly directed to an apparatus for producing an electrode catalyst used for a fuel cell. The apparatus includes: a noble metal supporting module that makes a noble metal carried at a predetermined support density on a carbon carrier having a specific surface area of not smaller than a predetermined value; a base metal supporting module that makes a base metal carried at a specified support density on the carbon carrier with the noble metal carried thereon; a heating module that heats the carbon carrier with the noble metal and the base metal carried thereon to a specific temperature that allows reduction of the base metal carried on the carbon carrier; and an alloying module that further heats up the carbon carrier with the noble metal and the base metal after the reduction of the base metal at the specific temperature, so as to alloy the noble metal and the base metal on the carbon carrier.

In the production method of the electrode catalyst of the present invention and its corresponding apparatus, one noble metal and one base metal are carried on the carbon carrier having the specific surface area of not smaller than the predetermined value. The carbon carrier with the noble metal and the base metal carried thereon is heated up to the specific temperature that allows reduction of the base metal. After the reduction of the base metal, the carbon carrier with the noble metal and the base metal is further heated up, so that the noble metal and the base metal are alloyed on the carbon carrier. The resulting electrode catalyst exerts the extremely high catalytic activity. A fuel cell including this electrode catalyst has the desirably high output potential.

In one preferable application of the production method of the invention and its corresponding apparatus, the noble metal is platinum and the base metal is iron. The noble metal is not restricted to platinum but may be selected among the group consisting of gold, silver, ruthenium, rhodium, palladium, osmium, and iridium. The base metal is not restricted to iron but may be selected among the group consisting of nickel, manganese, cobalt, chromium, copper, zinc, molybdenum, tungsten, germanium, and tin. In the production method and the corresponding apparatus discussed above as well as other applications of the present invention, the noble metal-base metal alloy is not restricted to the binary alloy of one noble metal and one base metal, but may be a ternary, quaternary, or hypercomplex alloy including two or a greater number of noble metals and two or a greater number of base metals.

The specific surface area of the carbon carrier is not smaller than 600 m$^2$/g and is more preferably not smaller than 800 m$^2$/g.

The specific temperature is set to ensure reduction of the noble metal and the base metal carried on the carbon carrier but to suppress the reaction of the carbon carrier and is in a range of 400° C. to 900° C. and is more preferably in a range of 500° C. to 700° C.

In accordance with one preferable application of the present invention, the noble metal supporting step adds a platinum complex solution, for example, an aqueous solution of platinum nitrate complex, platinum ammine complex, platinum carboxylate complex, or platinum sulfite complex to a dispersion of powdery carbon and subsequently mixes an oxidizing agent with the dispersion including the platinum complex solution.

In accordance with another preferable application of the present invention, the base metal supporting step adds an iron salt solution, for example, a solution of iron nitrate, iron hydroxide, iron chloride, or iron sulfate, to a dispersion of powdery carbon with platinum carried thereon, where a supply rate of the iron salt solution to the dispersion of powdery carbon ranges from 0.88 to 11 millimole/minute.

It is preferable that the base metal supporting step subsequently mixes an alkali solution with the dispersion including the iron salt solution, where a supply rate of the alkali solution to the dispersion including the iron salt solution ranges from 1.25 to 10 millimole/minute.

The electrode catalyst of the present invention following any of the above arrangements has the significantly higher catalytic activity, compared with the prior art electrode catalysts. The present invention is thus not restricted to the method of producing the electrode catalyst, but is also directed to the electrode catalyst thus produced. A first electrode catalyst for a fuel cell includes an alloy of a noble metal and a base metal carried on a carbon carrier, wherein an atomic number ratio of the base metal to the noble metal is not less than 0.14 in EDX analysis. The inventors of the present invention examined the variation in function of the electrode catalyst with a variation in atomic number ratio obtained by EDX analysis of the electrode catalyst. It has been found that the electrode catalyst produced according to the production method of the present invention discussed above has excellent performances and the atomic number ratio of the base metal to the noble metal in the electrode catalyst is not less than 0.14. The atomic number ratio means the ratio of the number of the base metal atoms to the number of the noble metal atoms, for example, Fe/Pt. The EDX analysis represents energy dispersive X-ray analysis, which makes each catalyst particle exposed to an electron beam and analyzes the X-ray spectrum generated by the interaction of the electron beam with the constituent atoms of the catalyst particle, so as to specify the elements included in the catalyst particle. The ratio of the number of the base metal atoms to the number of the noble metal atoms in the catalyst particle determined by this technique is different from the simple atomic ratio or weight ratio of the base metal to the noble metal as the total quantity carried on the carrier. The electrode catalyst having the atomic number ratio equal to or greater than the specified value ensures the enhanced catalytic function of the noble metal and exerts the excellent activity as the electrode catalyst for fuel cells.

The electrode catalyst of the present invention may be specified by a diversity of other properties. A second electrode catalyst for a fuel cell includes an alloy of a noble metal and a base metal carried on a carbon carrier, wherein a ratio of a binding number of noble metal atom with base metal atom to a total binding number relating to the noble metal atom is not less than 0.10 in EXAFS analysis. The inventors of the present invention examined the variation in function of the electrode catalyst with a variation in ratio of binding number obtained by EXAFS analysis of the electrode catalyst. It has been found that the electrode catalyst produced according to the production method of the present invention discussed above has excellent performances and the ratio of the binding number of the noble metal atom with the base metal atom to the total binding number relating to the noble metal atom in the electrode catalyst is not less than 0.10. The ratio of the binding number of the noble metal atom with the base metal atom to the total binding number relating to the noble metal atom is, for example, (Pt—Fe)/{(Pt—Fe)+(Pt—Pt)}, when the noble metal is platinum and the base metal is iron. Namely the ratio of the binding number represents the number of the adjoining noble metal atom and base metal atom (Pt—Fe) to the total binding number of the noble metal atom (Pt—Pt and Pt—Fe). The EXAFS analysis makes the sample exposed to X ray with varying energy and specifies the arrangement in the nanometer order based on the fine structure appearing on the resulting absorption spectrum. In the sample exposed to X ray, specific inner-shell electrons of a target atom are excited according to the wavelength of exposure and are flown out as photoelectrons. The photoelectrons are scattered in the presence of another atom close to the target atom. The scattering is observed as the fine structure of the absorption spectrum. Analysis of the fine structure of the absorption spectrum gives information regarding the another atom present in the vicinity of the target atom (for example, identification of the another atom and its distance). The ratio of the binding number of the noble metal atom with the base metal atom to the total binding number of the noble metal atom determined by this technique shows the atomic arrangement of the alloy and is different from the simple atomic ratio or weight ratio. The electrode catalyst having the ratio of the atom binding number equal to or greater than the specified value ensures the enhanced catalytic function of the noble metal and exerts the excellent activity as the electrode catalyst for fuel cells.

A third electrode catalyst for a fuel cell includes an alloy of a noble metal and a base metal carried on a carbon carrier, wherein a temperature of complete oxygen release from a powdery form of catalyst prior to production of an electrode is not higher than 280° C. The inventors of the present invention examined the variation in function of the electrode catalyst with a variation in temperature of complete oxygen release from the electrode catalyst. It has been found that the electrode catalyst produced according to the production method of the present invention discussed above has excellent performances and the complete oxygen release temperature of the electrode catalyst is not higher than 280° C. The powdery catalyst exposed to the atmospheric environment is used as the sample. The sample is gradually heated in a current of an inert gas (for example, helium gas), and the quantity of oxygen released from the sample is monitored. The complete oxygen release temperature represents the temperature at which release of oxygen from the sample is completed.

A fourth electrode catalyst for a fuel cell includes an alloy of a noble metal and a base metal carried on a carbon carrier, wherein a peak temperature of carbon dioxide release from a powdery form of catalyst prior to production of an electrode is not higher than 300° C. The inventors of the present invention examined the variation in function of the electrode catalyst with a variation in peak temperature of carbon dioxide release from the electrode catalyst. It has been found that the electrode catalyst produced according to the production method of the present invention discussed above has excellent performances and the carbon dioxide release peak temperature of the electrode catalyst is not higher than 300° C. The powdery catalyst exposed to the atmospheric environment is used as the sample. The sample is gradually heated in a current of an inert gas (for example, helium gas), and the quantity of carbon dioxide released from the sample is monitored. The carbon dioxide release peak temperature represents the temperature at which the release of carbon dioxide from the sample reaches its peak.

The electrode catalyst for the fuel cell including the alloy of the noble metal and the base metal carried on carbon may otherwise be specified by the quantity of adsorption of a single-composition gas. Namely the present invention is directed to a fifth electrode catalyst for a fuel cell, wherein a quantity of adsorption of a single-composition gas in a powdery form of catalyst prior to production of an electrode is not less than a specific value per one gram of the noble metal. For example, when the single-composition gas is carbon monoxide, the electrode catalyst having the adsorption quantity of not less than 12 Ncc per gram of the noble metal has the significantly higher catalytic activity than the prior art electrode catalysts. The single-composition gas may be carbon monoxide gas, carbon dioxide gas, hydrogen gas, or oxygen gas.

In one preferable embodiment of the electrode catalyst for the fuel cell, the noble metal is platinum and the base metal is iron. The combination of platinum and iron gives the extremely favorable catalytic activity.

Another application of the present invention is a method of evaluating the electrode catalyst.

The present invention is directed to a first evaluation method of performance of a fuel cell using an electrode catalyst, which includes an alloy of a noble metal and a base metal carried on carbon. The first evaluation method includes the steps of: feeding a supply of a single-composition gas to a holder unit, in which the electrode catalyst used for the fuel cell is held; determining a quantity of the single-composition gas adsorbed by the electrode catalyst; and computing an output potential of the fuel cell from the determined quantity of the adsorbed single-composition gas.

The inventors of the present invention have found that the performance of the fuel cell using the electrode catalyst, which includes the alloy of the noble metal and the base metal carried on carbon, can be evaluated by the quantity of adsorption of the single-composition gas, such as carbon monoxide gas. This procedure enables the performance of a resulting fuel cell to be evaluated based on the quantity of absorption of the single-composition gas by the electrode catalyst without actually manufacturing the fuel cell. This desirably shortens the lead time of development. The single-composition gas is not restricted to carbon monoxide gas, but may be another suitable gas like carbon dioxide gas, hydrogen gas, or oxygen gas.

The present invention is also directed to a second evaluation method of performance of a fuel cell using an electrode catalyst, which includes an alloy of a noble metal and a base metal carried on carbon. The second evaluation method includes the steps of: determining an atomic number ratio of the base metal to the noble metal in a powdery form of catalyst prior to production of an electrode by EDX analysis; and computing the output potential of the fuel cell from the determined ratio of the atom number.

The EDX analysis specifies the atomic number ratio of the base metal to the noble metal included in each catalyst particle. This is different from the simple atomic ratio or weight ratio of the base metal to the noble metal as the total quantity carried on the carrier. The electrode catalyst having the atomic number ratio equal to or greater than the specified value ensures the enhanced catalytic function of the noble metal and exerts the excellent activity as the electrode catalyst for fuel cells. The performance of a resulting fuel cell can be evaluated based on this atomic number ratio without actually manufacturing the fuel cell. This desirably shortens the lead time of development.

The present invention is further directed to a third evaluation method of performance of a fuel cell using an electrode catalyst, which includes an alloy of a noble metal and a base metal carried on carbon. The third evaluation method includes the steps of: determining a ratio of a binding number of noble metal atom with base metal atom to a total binding number relating to the noble metal atom in a powdery form of catalyst prior to production of an electrode by EXAFS analysis; and computing the output potential of the fuel cell from the determined ratio of the binding number.

The EXAFS analysis specifies the ratio of the binding number of the noble metal atom with the base metal atom to the total binding number of the noble metal atom in the powdery catalyst. The binding number ratio shows the atomic arrangement of the alloy and is different from the simple atomic ratio or weight ratio. The electrode catalyst having the ratio of the atom binding number equal to or greater than the specified value ensures the enhanced catalytic function of the noble metal and exerts the excellent activity as the electrode catalyst for fuel cells. The performance of a resulting fuel cell can be evaluated based on this binding number ratio, which represents the activity of the electrode catalyst, without actually manufacturing the fuel cell. This desirably shortens the lead time of development.

The present invention is also directed to a fourth evaluation method of performance of a fuel cell using an electrode catalyst, which includes an alloy of a noble metal and a base metal carried on carbon. The fourth evaluation method includes the steps of: measuring a temperature of complete oxygen release from a powdery form of catalyst prior to production of an electrode; and computing the output potential of the fuel cell from the observed temperature of complete oxygen release.

The inventors of the present invention have found that the performance of the fuel cell including the noble metal-base metal alloy electrode catalyst can be evaluated by measuring the temperature of complete oxygen release from the powdery form of catalyst prior to production of the electrode. The powdery catalyst is gradually heated, and the quantity of oxygen released from the powdery catalyst is monitored. The temperature at which release of oxygen from the powdery catalyst is completed is measured. The lower complete oxygen release temperature ensures the better catalytic function after production of the electrode. Measurement of the complete oxygen release temperature accordingly determines the output potential of a resulting fuel cell and evaluates the performance of the electrode catalyst in the resulting fuel cell. The performance of the resulting fuel cell can thus be evaluated based on the observed complete oxygen release temperature without actually manufacturing the fuel cell. This desirably shortens the lead time of development.

The present invention is further directed to a fifth evaluation method of performance of a fuel cell using an electrode catalyst, which includes an alloy of a noble metal and a base metal carried on carbon. The fifth evaluation method includes the steps of: measuring a peak temperature of carbon dioxide release from a powdery form of catalyst prior to production of an electrode; and computing the output potential of the fuel cell from the observed peak temperature of carbon dioxide release.

The inventors of the present invention have found that the performance of the fuel cell including the noble metal-base metal alloy electrode catalyst can be evaluated by measuring the peak temperature of carbon dioxide release from the powdery form of catalyst prior to production of the electrode. The powdery catalyst is gradually heated, and the quantity of carbon dioxide released from the powdery catalyst is monitored. The peak temperature at which release of carbon dioxide from the powdery catalyst reaches its peak is measured. The lower carbon dioxide release peak temperature ensures the better catalytic function after production of the electrode. Measurement of the carbon dioxide release peak temperature accordingly determines the output potential of a resulting fuel cell and evaluates the performance of the electrode catalyst in the resulting fuel cell. The performance of the resulting fuel cell can thus be evaluated based on the observed carbon dioxide release peak temperature without actually manufacturing the fuel cell. This desirably shortens the lead time of development.

In one preferable embodiment of the evaluation method, the noble metal and the base metal as the constituents of the electrode catalyst are platinum and iron, respectively. The above evaluation method can accurately evaluate the function of the catalyst of this combination in the resulting fuel cell. The noble metal is not restricted to platinum but may be selected among the group consisting of gold, silver, ruthenium, rhodium, palladium, osmium, and iridium. The base metal is not restricted to iron but may be selected among the group consisting of nickel, manganese, cobalt, chromium, copper, zinc, molybdenum, tungsten, germanium, and tin.

Still another application of the present invention is an evaluation apparatus for performance of a fuel cell.

The present invention is thus directed to an apparatus for evaluating performance of a fuel cell using an electrode catalyst, which includes an alloy of a noble metal and a base metal carried on carbon. The evaluation apparatus includes: a single-composition gas supply module that feeds a supply of a single-composition gas to a holder unit, in which the electrode catalyst used for the fuel cell is held; an adsorption quantity determination module that determines a quantity of the single-composition gas adsorbed by the electrode catalyst; and an output potential computation module that computes an output potential of the fuel cell from the determined quantity of the adsorbed single-composition gas.

This apparatus enables the performance of the fuel cell to be evaluated in the form of electrode catalyst prior to manufacture of a unit cell, and thereby exerts the same effects as those of the evaluation method discussed previously. The single-composition gas may be selected among the group consisting of carbon monoxide gas, carbon dioxide gas, hydrogen gas, and oxygen gas.

A further application of the present invention is a method of manufacturing a fuel cell. The fuel cell is manufactured by utilizing the electrode catalyst described above and the evaluation method of the electrode catalyst.

The present invention is thus directed to a manufacturing method of a fuel cell, which includes: a noble metal supporting step that makes a noble metal carried at a predetermined support density on a carbon carrier having a specific surface area of not smaller than a predetermined value; a base metal supporting step that makes a base metal carried at a specified support density on the carbon carrier with the noble metal carried thereon; a heating step that heats the carbon carrier with the noble metal and the base metal carried thereon to a specific temperature that allows reduction of the base metal carried on the carbon carrier; an alloying step that further heats up the carbon carrier with the noble metal and the base metal after the reduction of the base metal at the specific temperature, so as to alloy the noble metal and the base metal on the carbon carrier; an evaluation step that evaluates a powdery form of the alloyed electrode catalyst; and fixing the evaluated powdery form of electrode catalyst on an electrolyte membrane to form a unit cell.

This producing method enables the performance of the electrode catalyst for the fuel cell to be evaluated prior to manufacture of a unit cell and thereby effectively prevents manufacture of defective unit cells having insufficient performances. After fixation of the powdery catalyst to the electrolyte membrane in the unit cell, it is extremely difficult to separate the catalyst from the electrolyte membrane. Evaluation of the electrode catalyst and subsequent manufacture of the unit cell using the evaluated electrode catalyst is thus significantly advantageous. The electrode catalyst in a fuel cell stack obtained by laminating these unit cells exerts the desired performances.

The evaluation step in the manufacturing method of the fuel cell carries out evaluation based on any of the following data, as discussed previously with regard to the evaluation method of the electrode catalyst:

(1) the quantity of the single-composition gas, such as carbon monoxide gas, adsorbed by the electrode catalyst;

(2) the atomic number ratio of the base metal to the noble metal in the powdery catalyst prior to production of the electrode, measured by EDX analysis;

(3) the ratio of the binding number of the noble metal atom with the base metal atom to the total binding number of the noble metal atom in the powdery catalyst prior to production of the electrode, measured by EXAFS analysis;

(4) the temperature of complete oxygen release from the powdery catalyst prior to production of the electrode; and (5) the peak temperature of carbon dioxide release from the powdery catalyst prior to production of the electrode.

In one preferable embodiment of the producing method, the noble metal is platinum and the base metal is iron. The electrode catalyst of this combination ensures the favorable performance of the resulting fuel cell. The noble metal and the base metal are, however, not restricted to this combination. The alloy catalyst may include a greater number of noble metals or base metals to be a ternary, quaternary, or hypercomplex form as described previously.

The present invention is further directed to another method of producing a noble metal-containing electrode catalyst used for a fuel cell. This method makes a noble metal carried at a predetermined support density on a carbon carrier having a specific surface area of not less than 600 $m^2/g$ and less than 1000 $m^2/g$. A typical example of the noble metal is platinum. The inventors of the present invention previously found that a noble metal-containing catalyst carried on a carbon carrier having a specific surface area of not less than 1000 $m^2/g$ exerts excellent performances. As a result of further study, the inventors have found that a noble metal-containing catalyst carried on a carbon carrier having a specific surface area of not less than 600 $m^2/g$ and less than 1000 $m^2/g$ also exerts excellent performances as the electrode catalyst.

The se and other objects, features, aspects, and advantages of the present invention will become more apparent from the following detailed description of the preferred embodiments with the accompanying drawings.

DESCRIPTION OF THE PREFERRED EMBODIMENTS

Figure 1:
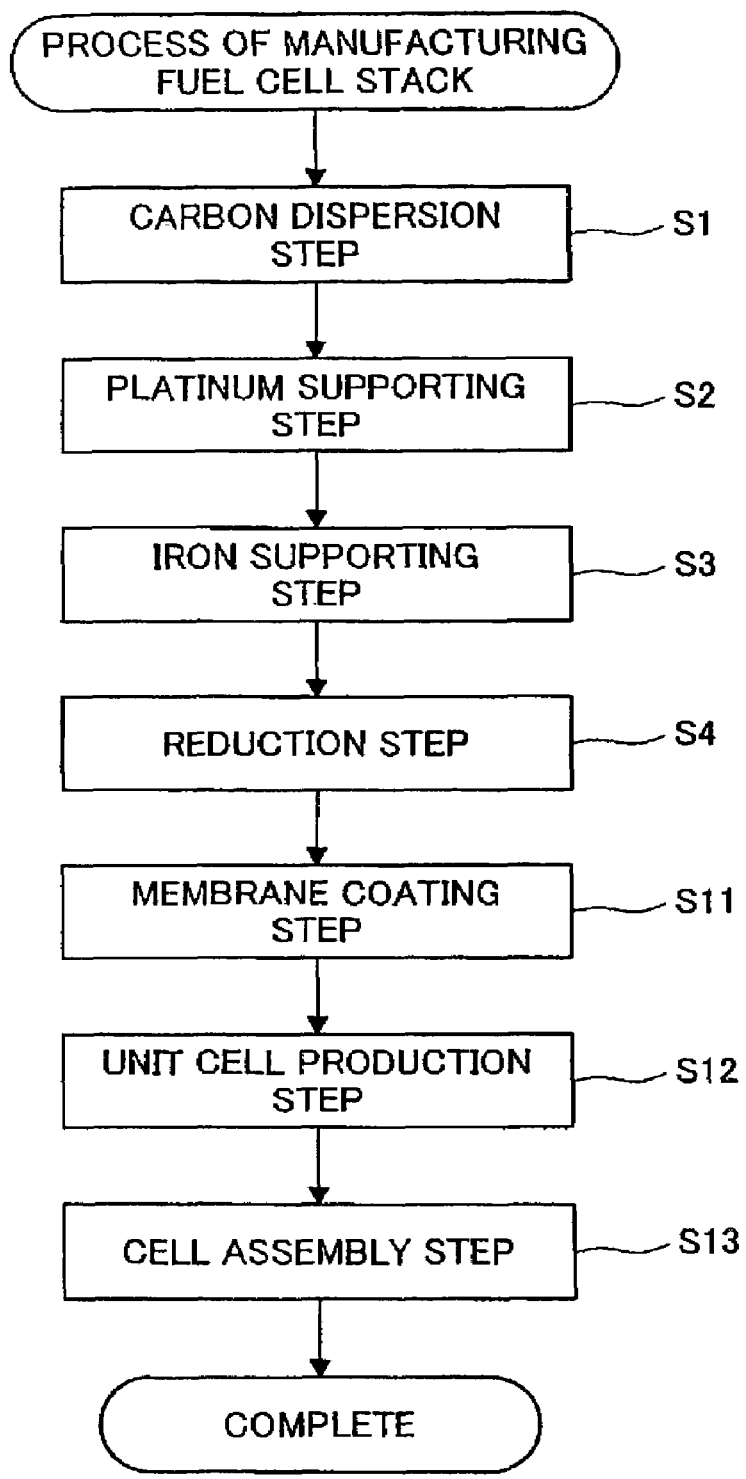
FIG. 1 is a flowchart showing a process of manufacturing a fuel cell stack in a first embodiment of the present invention.

A method of manufacturing a stack of fuel cells is discussed as a first embodiment of the present invention. FIG. 1 is a flowchart showing a process of manufacturing a fuel cell stack in the first embodiment.

The manufacturing process of this embodiment shown in FIG. 1 is mainly divided into two parts, that is, a process of producing an electrode catalyst (steps S1 through S4) and a process of assembling a fuel cell stack (steps S11 through S13). These two parts are described in this sequence. The process for production of the electrode catalyst first carries out a carbon dispersion step to make carbon black dispersed in water with stirring (step S1). The concrete procedure adds 579 g of carbon black powder having a specific surface area of not less than 205 $m^2/g$ (preferably not less than 600 $m^2/g$) to 58 liters of water, and stirs the aqueous solution with the carbon black powder for 4 hours to make the carbon black powder sufficiently dispersed in water.

The process then carries out a platinum supporting step to make platinum carried on the carbon black (step S2). This step includes three sub-steps:

(1) The first sub-step selects platinum as a noble metal, adds a mixture of platinum sulfite containing 390 g of platinum with 8000 g of aqueous sulfuric acid to the aqueous solution with the carbon black powder dispersed therein, and sufficiently stirs the solution mixture.

(2) The second sub-step adds 7 liters of hydrogen peroxide to the solution mixture dropwise in 2 hours, heats the resulting solution to a certain temperature (95° C. in this embodiment) in 1 hour, holds the resulting solution at the certain temperature for 1 hour, and cools the resulting solution down to room temperature.

(3) The third sub-step filters off the resulting powder, washes the resulting powder with distilled water until the filtrate has pH of 5 or higher, and dries the washed powder in vacuum at 100° C. for 6 hours.

This step gives 963 g of platinum-support carbon, in which 40% by weight of platinum is carried on the carbon black powder. The percent by weight of platinum contained in a resulting catalyst is regulated by adjusting the quantity of the platinum sulfite added to the carbon black powder dispersed in water. The support density of platinum should be in a range of 15% by weight to 70% by weight to ensure the functions required for the electrode catalyst. The functions of the resulting catalyst will be discussed later. The platinum-support carbon is dried for precise regulation of the quantity of the electrode catalyst. After stabilization of the manufacturing process, the process may omit the drying and shift to the subsequent step (step S3) immediately after the washing.

The process subsequently carries out an iron supporting step to make iron carried on the platinum-support carbon (step S3). This step includes four sub-steps:
(1) The first sub-step adds the dried platinum-support carbon (963 g) to 5.5 liters of water, and stirs the mixture for 1 hour to sufficiently disperse the platinum-support carbon in water.
(2) The second sub-step adds 6.6 liters of 0.1 M iron nitrate hexahydrate ($Fe(NO_3)_3 \cdot 6H_2O$) dropwise to the dispersion in 1 hour and stirs the solution mixture for 2 hours. The dropping rate is 0.11 liter/minute, which corresponds to 11 millimole/minute as the iron (Fe) atom. On completion of the dropping, the platinum-iron alloy composition has 33% by atom of iron. Namely the ratio is 3 platinum atoms to 1 iron atom.
(3) The third sub-step adds 3.6 liters of 1.7% aqueous ammonia dropwise to the solution mixture in 3 hours with stirring. The dropping rate is 20 cc/minute, which corresponds to 10 millimole/minute as the ammonia molecule. Here the aqueous ammonia is not restrictive, but any substance that alkalizes the aqueous solution is applicable. The aqueous solution is alkalized to pH 10 by addition of aqueous ammonia or another suitable substance.
(4) Iron hydroxide $Fe(OH)_3$ deposits on the platinum-support carbon through the above sub-steps. The fourth sub-step evaporates the aqueous solution to a solid substance, filters off the solid substance, and washes the solid substance with distilled water until the filtrate has pH of not less than 4.5, and dries the washed solid substance in vacuum at 100° C. for 6 hours.

This step gives a carbon catalyst with 38.8% by weight of platinum and 3.7% by weight of iron carried thereon.

The process then carries out a reduction step to reduce the carbon catalyst thus obtained (step S4). This reduction step includes two sub-steps:
(1) The first sub-step crushes the carbon catalyst to powder and places the powdery carbon catalyst in an electric furnace.
(2) The second sub-step heats the powdery carbon catalyst in the electric furnace to an iron-reducible temperature (500° C. in this embodiment) in a stream of 100% gaseous hydrogen in 4 hours, holds the powdery carbon catalyst at the iron-reducible temperature for 1 hour, further heats the powdery carbon catalyst to a temperature of 900° C. in a stream of gaseous nitrogen, holds the powdery carbon catalyst at the temperature of 900° C. for 1 hour, and cools the heated powdery carbon catalyst down to room temperature.

This step completes a platinum-iron alloy-support electrode catalyst, on which 38.8% by weight of platinum and 3.7% by weight of iron is almost completely alloyed and carried. This series of process corresponds to Process 1 in Table 3 discussed later.

The manufacturing process completes the production of the electrode catalyst and shifts to the process of assembling a fuel cell stack. The process carries out a membrane coating step, which mixes the electrode catalyst produced by the electrode catalyst production process with a polymer electrolyte and an organic alcohol solvent with stirring and applies and fixes the resulting ink-like electrode catalyst mixture on an electrolyte membrane (step S11). This membrane coating step is known as the Decal method, although another technique may be applied for this membrane coating step. The polymer electrolyte and the organic alcohol solvent are those known in the art. The membrane coating step gives a membrane-electrode assembly (hereinafter referred to as MEA), in which the electrode catalyst is fixed to the electrolyte membrane. The process then carries out a unit cell production step to join the MEA with a separator and produce a unit cell (step S12). The process subsequently carries out a cell assembly step, which lays a desired number of unit cells one upon another to form a cell laminate and interposes the cell laminate between a pair of collectors to assemble a fuel cell stack (step S13).

The series of manufacturing process discussed above accordingly gives a stack of fuel cells (fuel cell stack). The resulting fuel cell stack is subjected to evaluation using an IR compensation voltage Vi, which is an output voltage with compensation of an internal resistance. The IR compensation voltage Vi is converted to a value per 0.2 milligrams of catalytic platinum (Pt) contained in 1 cm2 of the electrode and represents an output voltage (unit: millivolt) under the condition of an electric current of 0.5 A per 1 cm2 of the electrode.

The fuel cell stack with the platinum-iron alloy-support electrode catalyst obtained by the above process showed a extremely favorable property. In the fuel cell with the electrode catalyst obtained by the process of the embodiment, the IR compensation voltage Vi with regard to each unit cell exceeded 780 millivolts, which was significantly better than the IR compensation voltage of a fuel cell stack with the conventional electrode catalyst.

Figure 2:
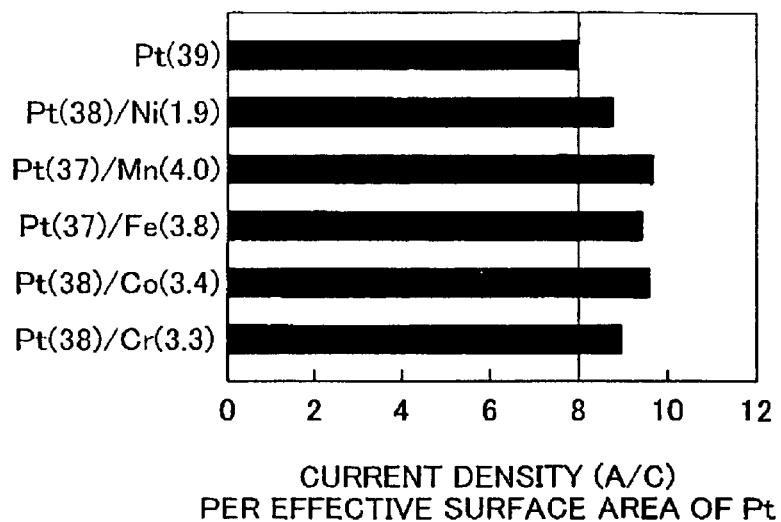
FIG. 2 is a graph showing the properties of noble metal-base metal alloy electrode catalysts obtained according to the process in the first embodiment of the present invention.

The properties of the platinum-iron alloy-support electrode catalyst and other platinum-base metal alloy catalysts were measured, in comparison with the conventional platinum catalyst. FIG. 2 is a graph showing the observed current density (A/C) per effective surface area of platinum with regard to a diversity of electrode catalysts, where the total quantity of metals carried on carbon is regulated to a fixed value (40% by weight). The conditions of measurement were:
  ratio of platinum atom to base metal atom in the alloy catalyst: 3 to 1;
  electrolyte membrane: Nafion N115 (trade-mark; manufactured by du Pont)
  cell temperature 80° C.

As shown in the graph of FIG. 2, the platinum-iron, platinum-nickel, platinum-manganese, platinum-cobalt, and platinum-chromium alloy catalysts had the higher current density than that of the simple platinum catalyst. Similar tendency was observed in the case of alloy catalysts including a noble metal other than platinum and a base metal like iron and nickel.

In the producing process, a variety of factors affect the functions of the resulting catalyst. The following discusses five important factors for the enhanced functions of the electrode catalyst:
(1) the specific surface area of carbon black;
(2) the reduction temperature in the reduction step;
(3) the dropping rate of an oxidizing reagent, such as hydrogen peroxide in the platinum supporting step;
(4) the dropping rate of an iron salt solution, such as iron nitrate, in the iron supporting step; and (5) the dropping rate of an alkali solution, such as aqueous ammonia, in the iron supporting step.

[Varying Function of Electrode Catalyst with Variation in Specific Surface Area of Carbon Black]

The specific surface area of carbon black used as the carrier significantly affects the function of the resulting electrode catalyst. The IR compensation voltage Vi (unit: millivolt) was measured relative to the BET specific surface area (unit: $m^2/g$) of carbon black. The result of measurement is shown in Table 1.

TABLE 1

| Specific Surface Area | IR Compensation Voltage Vi |
|---|---|
| 42 | 726 |
| 62 | 732 |
| 77 | 742 |
| 84 | 740 |
| 242 | 743 |
| 256 | 745 |
| 800 | 785 |
| 1000 | 805 |
| 1250 | 810 |

Figure 3:
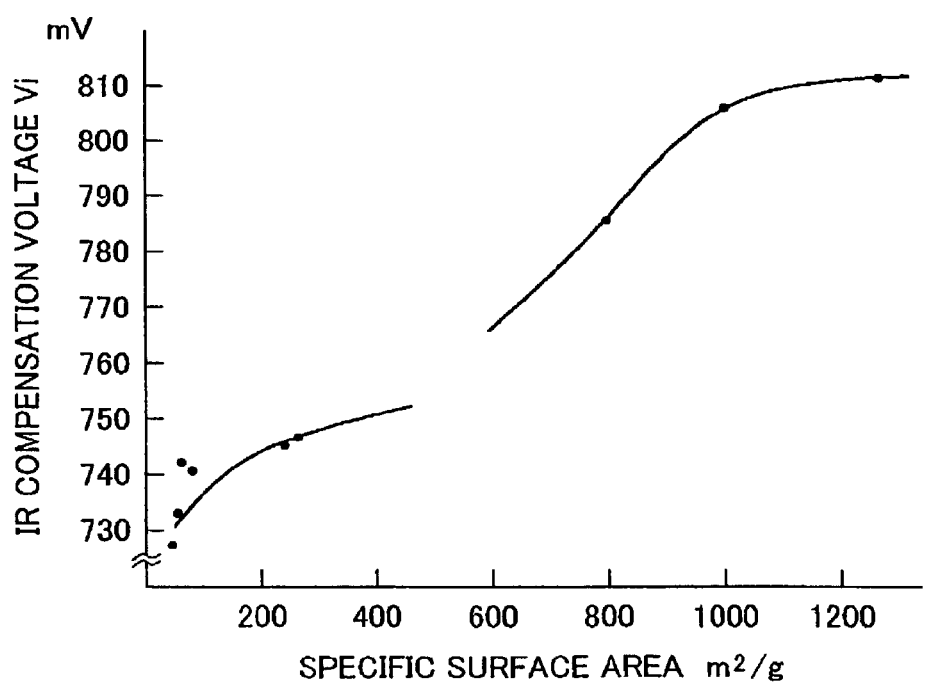
FIG. 3 is a graph showing the IR compensation voltage Vi plotted against the specific surface area in fuel cells using the electrode catalysts obtained according to the process of the first embodiment.

The result of measurement is also plotted in the graph of FIG. 3. According to the graph of FIG. 3, it is assumed that the relationship between the specific surface area and the IR compensation voltage Vi in a lower specific surface area range of less than 600 $m^2/g$ is different from that in a higher specific surface area range of greater than 600 $m^2/g$. In the process of producing the platinum-iron alloy-support electrode catalyst, it is preferable to use carbon black having a specific surface area of greater than 600 $m^2/g$ as the carrier for the favorable properties of the resulting fuel cell stack.

[Reduction Temperature in Reduction Step]

The properties of the electrode catalyst were measured relative to the reduction temperature in the reduction step S4 shown in the flowchart of FIG. 1. The result of measurement is shown in Table 2. Carbon black having a specific surface area of 1000 $m^2/g$ was used for the measurement. The EDX value and the EXAFS value in Table 2 will be discussed later.

TABLE 2

| Reduction Temperature | EDX Value | EXAFS Value | IR Compensation Voltage |
|---|---|---|---|
| 350 | 0.16 | 0.13 | 765 |
| 450 | 0.19 | 0.18 | 805 |
| 600 | 0.24 | 0.29 | 815 |

Figure 4:
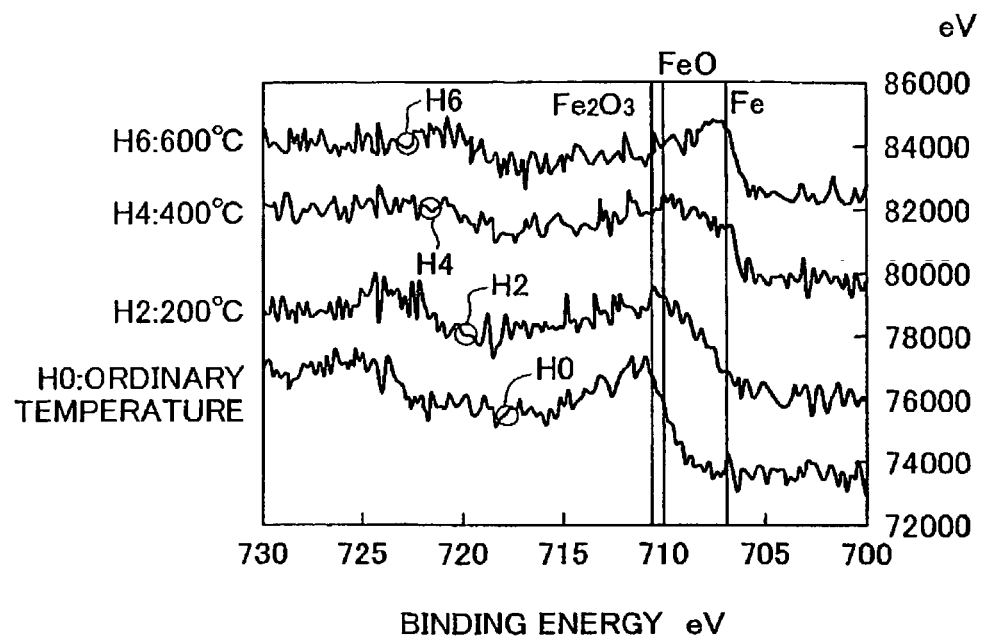
FIG. 4 is a graph showing the energy intensity of electrons released by exposure of the platinum-iron alloy electrode catalyst to X ray.

As clearly seen in Table 2, the reduction temperature is set to be not lower than 400° C. or more preferably not lower than 450° C., in order to ensure the sufficient level of the IR compensation voltage. It is expected that the reduction temperature of not lower than 400° C. ensures complete reduction of iron carried together with platinum on carbon to exert the sufficient catalytic function. In order to support this assumption, the relationship between the reduction temperature and the binding energy was measured by XPS analysis. The result of measurement is shown in the graph of FIG. 4. The XPS analysis makes the platinum-iron alloy catalyst exposed to X ray and plots the energy intensity of electrons released by the exposure. In the graph of FIG. 4, the binding energy (unit: eV) is plotted as abscissa, and the number of released electrons as ordinate, with regard to various reduction temperatures. Iron carried together with platinum on carbon may be present in three different forms, iron oxide FeO, diiron trioxide $Fe_2O_3$, and reduced iron Fe (in the non electron-binding state of high electronegativity) The binding energy is known in these three states. Detection of the energy intensity of the released electrons accordingly specifies the actual form of iron carried on carbon.

A graph H6 at a reduction temperature of 600° C. has a clear peak at 707 eV. This proves the presence of iron in mostly reduced state. In the case of reduction process at ordinary temperature or at a temperature of 200° C. (graphs H0 and H2), iron is mostly present in the form of iron oxide. In the case of reduction process at a temperature of 400° C. (graph H4), it is supposed that a considerable fraction of iron is present in the reduced state. The reduction temperature of not lower than 400° C. accordingly enables both platinum and iron to be present in the reduced state in the platinum-iron alloy-support electrode catalyst. As shown in Table 1, the unit cell with this electrode catalyst has the sufficiently high IR compensation voltage.

[Dropping Rate of Hydrogen Peroxide in Platinum Supporting Step]

The dropping rate of hydrogen peroxide in the platinum supporting step S2 is approximately one tenth the dropping rate in the conventional producing process. Such lower dropping rate enhances the dispersibility of platinum depositing on the surface of carbon and causes the platinum particles to have the particle diameter of approximately 2 nanometers (nm). The properties of the platinum-iron alloy catalyst are thus significantly improved, compared with the properties of the catalyst produced by the conventional producing process.

[Dropping Rate of Iron Nitrate in Iron Supporting Step]

The dropping rate of iron nitrate in the iron supporting step S3 was set to 8.8 cc/minutes (0.88 millimole/minute). The effect of the dropping rate of iron nitrate and the effect of the dropping rate of ammonia were evaluated. 3 shows the observed values of the IR compensation voltage Vi with regard to multiple unit cells including electrode catalysts obtained under various dropping rates of these reagents.

TABLE 3

| Process | Process 1 | Process 2 | Process 3 | Process 4 |
|---|---|---|---|---|
| Dropping Rate of Iron Nitrate | 110 (cc/min.) | 8.8 (cc/min.) | ← | ← |
| Dropping Rate of Ammonia | 20 (cc/min.) | ← | 2.5 (cc/min.) | ← |
| Reduction Step | 400° C. | ← | ← | 800° C. |
| IR Compensation Voltage | 745 | 785 | 805 | 815 |

←: Same as in the left

As shown in Table 3, Process 1 and Process 2 adopted the same conditions except the dropping rate of iron nitrate. The dropping rate of iron nitrate (0.88 millimole/minute) in Process 2 was approximately 1/10 the dropping rate in Process 1 (11 millimole/minute). The IR compensation voltage Vi of the unit cell with the electrode catalyst obtained by Process 1 was 745 millivolts, whereas the IR compensation voltage Vi of the unit cell with the electrode catalyst obtained by Process 2 was 785 millivolts. The lower dropping rate of iron nitrate significantly improved the property of the resulting electrode catalyst.

[Dropping Rate of Ammonia in Iron Supporting Step]

Process 2 and Process 3 adopted the same conditions except the dropping rate of ammonia, which was used to make iron deposit on the carbon carrier in the iron supporting step S3. Process 2 had a relatively high ammonia dropping rate of 20 cc/minute, whereas Process 3 had a significantly lower ammonia dropping rate of 2.5 cc/minute (1/8 the dropping rate in Process 2). The lower dropping rate of ammonia further improved the IR compensation voltage of the unit cell with the electrode catalyst to 805 millivolts.

[Reduction Temperature in Reduction Step]

Process 3 and Process 4 adopted the same conditions except the reduction temperature in the reduction step S4. The reduction temperature was 400° C. in Process 3, and was 500° C. in Process 4. The higher reduction temperature improved the IR compensation voltage of the unit cell with the electrode catalyst to 815 millivolts.

Figure 5:
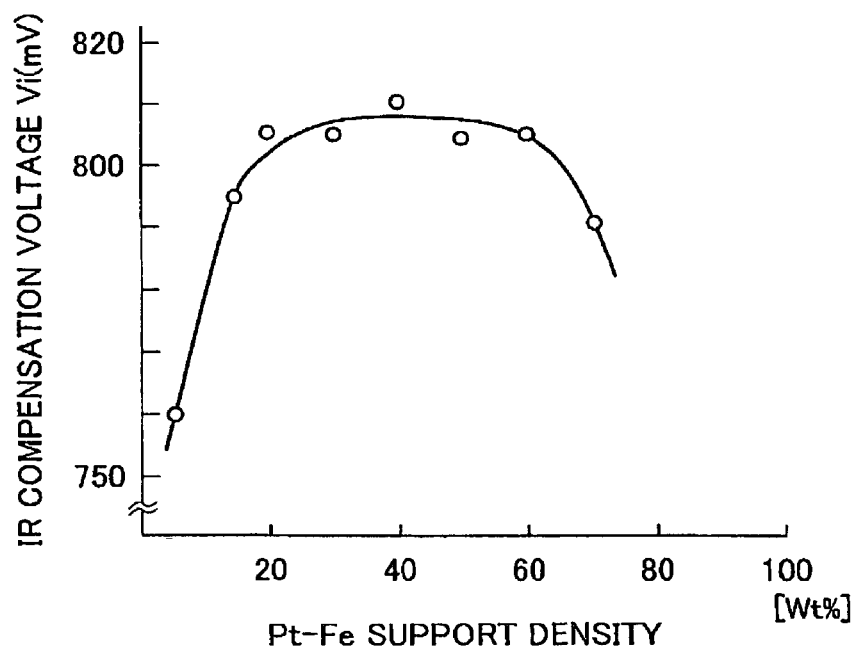
FIG. 5 is a graph showing the relationship between the platinum-iron alloy support density of each electrode catalyst and the IR compensation voltage Vi in each unit cell including the electrode catalyst.

The support density of the platinum-iron alloy on the carbon carrier in the electrode catalyst produced by the above producing process is set in an adequate range to attain the required performance of the unit cell. In this embodiment, the preferable range of the support density of the platinum-iron alloy is 15 to 70%. The IR compensation voltage of the unit cell with the electrode catalyst is plotted against the support density of the platinum-iron alloy in the graph of FIG. 5. As shown in the graph of FIG. 5, the support density of the platinum-iron alloy catalyst of the embodiment is freely adjustable in the range of 15 to 70%.

Figure 6:
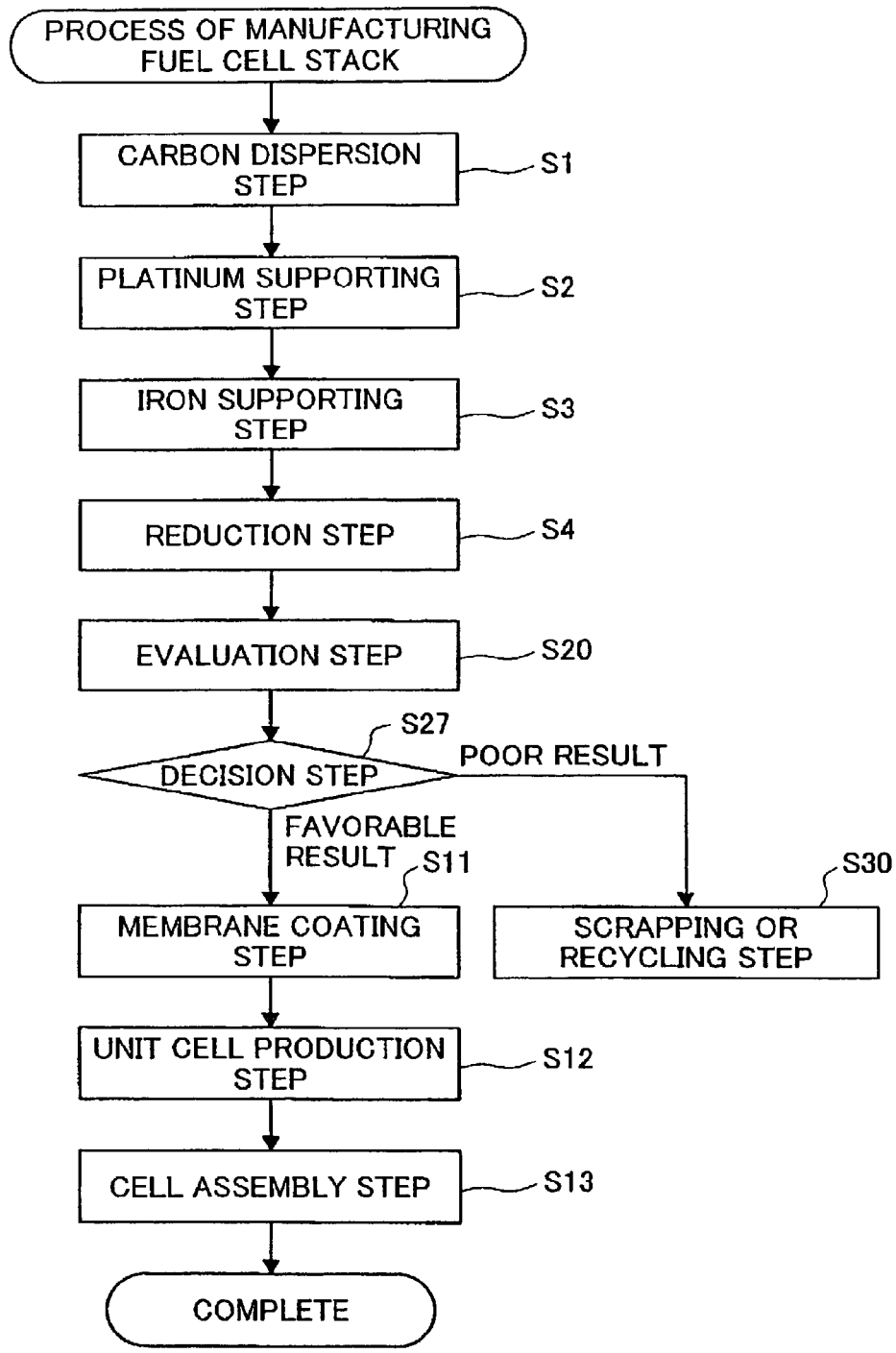
FIG. 6 is a flowchart showing a process of manufacturing a fuel cell stack in a second embodiment of the present invention.

The following describes another method of manufacturing a stack of fuel cells as a second embodiment of the present invention. The method of manufacturing the fuel cell stack includes an electrode catalyst production process and an electrode catalyst evaluation process. FIG. 6 is a flowchart showing a process of manufacturing a fuel cell stack in the second embodiment.

The manufacturing process of the second embodiment shown in the flowchart of FIG. 6 is similar to the manufacturing process of the first embodiment, but includes an evaluation step S20 for evaluating the electrode catalyst after the reduction step S4. The electrode catalyst obtained according to the electrode catalyst production process S1 through S4 is evaluated at the evaluation step S20. Only the electrode catalyst having the favorable result of evaluation at a decision step S27 is subjected to the membrane coating step S11 of the fuel cell assembly process. The electrode catalyst having the poor result of evaluation at the decision step S27 is excluded here and subjected to a scrapping or recycling step S30.

The resulting fuel cell stack obtained in this embodiment uses the evaluated electrode catalyst, and accordingly has excellent properties and little variation in performance. Application of this electrode catalyst significantly reduces the difference among individual unit cells and ensures manufacture of unit cells exerting favorable cell performances. The unit cells having little individual difference and exerting favorable cell performances ensure manufacture of a fuel cell stack having excellent cell properties and little variation in performance among respective unit cells.

Figure 7:
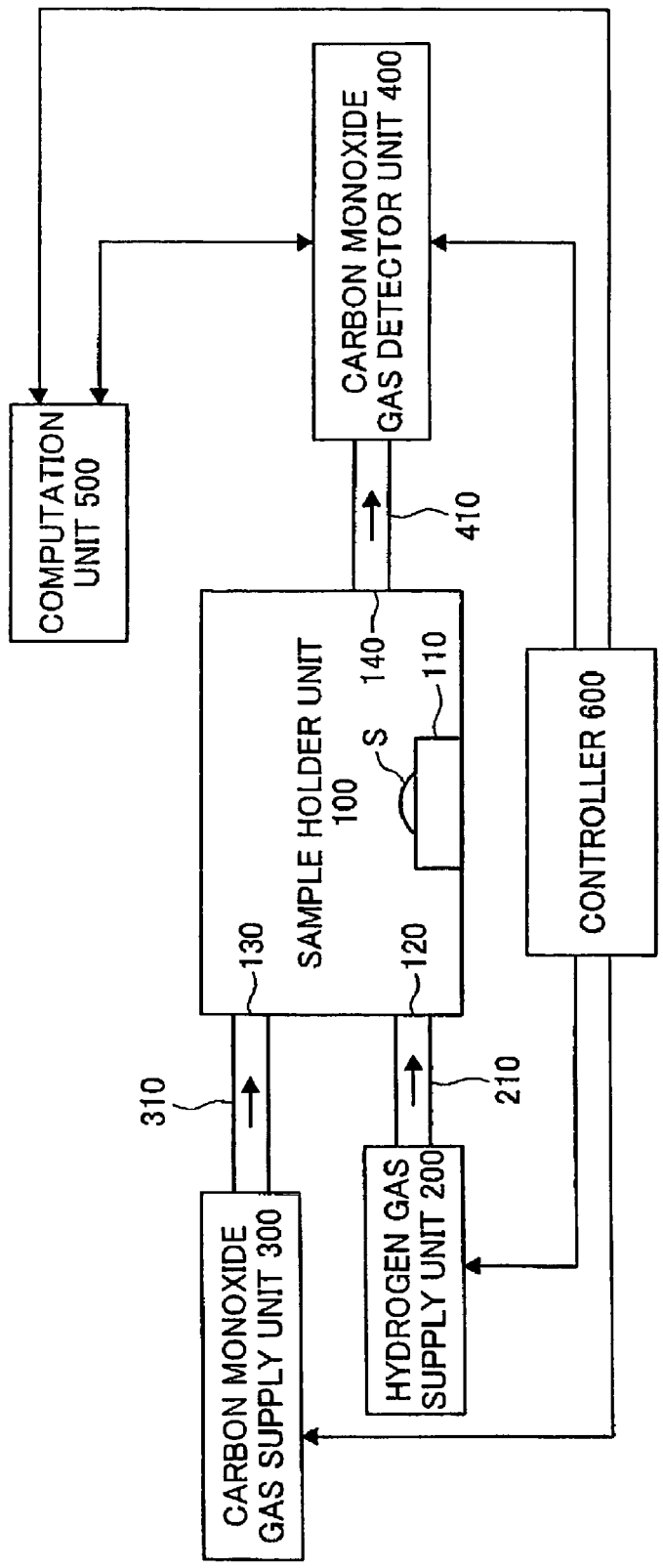
FIG. 7 schematically illustrates the structure of an evaluation apparatus for fuel cells used in the evaluation step S20 in the process of the second embodiment shown in FIG. 6.

The evaluation carried out in this embodiment is described in detail. The inventors have developed multiple techniques for evaluation. The first evaluation method is based on the quantity of adsorption of a single-composition gas (carbon monoxide in this embodiment). FIG. 7 schematically illustrates the structure of an evaluation apparatus for fuel cells used in the evaluation step of the manufacturing process in the second embodiment.

The evaluation apparatus for fuel cells includes a sample holder unit 100 that holds as a sample the electrode catalyst, which is produced through the electrode catalyst production process S1 through S4 and is dried to the powdery form, a hydrogen gas supply unit 200 that feeds a supply of hydrogen gas to the sample holder unit 100, and a carbon monoxide gas supply unit 300 that feeds a supply of carbon monoxide gas, which is one of single-composition gases. The evaluation apparatus also includes a carbon monoxide gas detector unit 400 that detects carbon monoxide gas discharged from the sample holder unit 100, a computation unit 500 that computes a performance (expected value of IR compensation voltage) of each fuel cell tested from detected data, and a controller 600 that controls the operations of the hydrogen gas supply unit 200, the carbon monoxide gas supply unit 300, the carbon monoxide gas detector unit 400, and the computation unit 500. For convenience of explanation, the sample holder unit 100 is expanded in the drawing of FIG. 7. The illustration of FIG. 7 does not reflect the actual size of the sample holder unit 100 nor the size relation among the respective constituents including the units 100, 200, and 300.

The sample holder unit 100 includes a sample table 110, on which each electrode catalyst sample S is mounted, a hydrogen gas inlet 120, a carbon monoxide gas inlet 130, and a carbon monoxide gas outlet 140. Each of the inlets 120 and 130 and the outlet 140 is provided with a valve mechanism (not shown) to prevent an undesired inflow of hydrogen gas or carbon monoxide gas to the sample holder unit 100 and an undesired outflow of carbon monoxide gas from the sample holder unit 100. The hydrogen gas fed into the sample holder unit 100 is released to the air via a non-illustrated outlet.

The hydrogen gas supply unit 200 has a hydrogen gas supply conduit 210, through which the supply of hydrogen gas is fed to the sample holder unit 100. The hydrogen gas supply conduit 210 is connected to the hydrogen gas inlet 120. The hydrogen gas supply unit 200 feeds the supply of hydrogen gas to reduce the electrode catalyst sample S as pre-treatment of the cell performance evaluation. The hydrogen gas supply unit 200 is also provided with a heater (not shown) for heating the hydrogen gas and a supply pump (not shown) for feeding the hydrogen gas. The temperature of the supplied hydrogen gas is in a range of 80° C. to 200° C.

The carbon monoxide gas supply unit 300 has a carbon monoxide gas supply conduit 310, through which the supply of carbon monoxide gas is fed to the sample holder unit 100. The carbon monoxide gas supply conduit 310 is connected to the carbon monoxide gas inlet 130. The carbon monoxide gas supply unit 300 is also provided with a heater (not shown) for heating the carbon monoxide gas and a supply pump (not shown) for feeding the carbon monoxide gas. The carbon monoxide gas supply unit 300 feeds a preset mass of carbon monoxide gas in a pulse-like state at 80° C.

The carbon monoxide gas detector unit 400 has a carbon monoxide gas introduction conduit 410, which is connected to the carbon monoxide gas outlet 140 and is used to introduce a non-adsorbed carbon monoxide gas into the carbon monoxide gas detector unit 400. The carbon monoxide gas detector unit 400 is also provided with a sensor (not shown) for measuring the quantity of carbon monoxide included in the introduced carbon monoxide gas and a suction pump for accelerating introduction of the carbon monoxide gas.

The computation unit 500 is linked with the carbon monoxide gas detector unit 400 and calculates the quantity of adsorbed carbon monoxide (Ncc/g–Pt) by the electrode catalyst sample S from the difference between the total quantity of carbon monoxide included in the supply of carbon monoxide gas fed to the sample holder unit 100 and the quantity of carbon monoxide measured by the carbon monoxide gas detector unit 400. The quantity of adsorbed carbon monoxide calculated here is the quantity of adsorption (unit: cc) per unit mass of platinum at standard conditions. The computation unit 500 computes the expected value of IR compensation voltage Vi in the unit cell with the electrode catalyst, based on the calculated quantity of adsorbed carbon monoxide.

The controller 600 gives an instruction of supplying hydrogen gas to the hydrogen gas supply unit 200 and an instruction of supplying carbon monoxide gas to the carbon monoxide gas supply unit 300 in a preset order. The controller 600 receives the observed quantity of carbon monoxide from the carbon monoxide gas detector unit 400 and actuates the computation unit 500 to compute the quantity of carbon monoxide adsorbed by the electrode catalyst sample S. The following describes the preset order, the detailed control procedure, and an evaluation process utilizing this evaluation apparatus.

Figure 8:
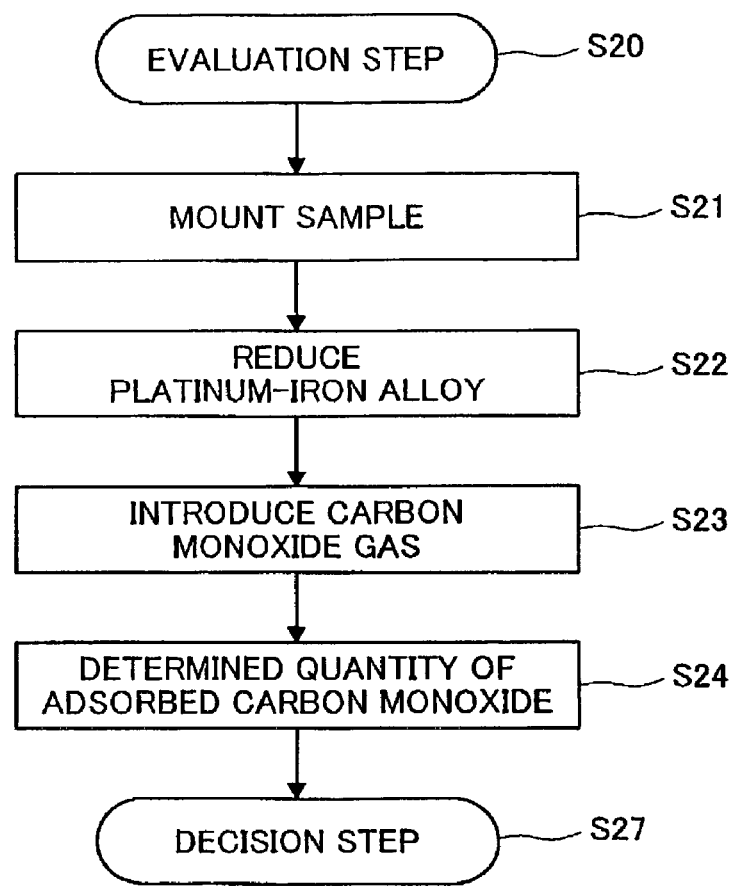
FIG. 8 is a flowchart showing the details of the evaluation step S20.

FIG. 8 is a flowchart showing the detailed procedure of the evaluation step S20. The evaluation step S20 evaluates each electrode catalyst of interest with the evaluation apparatus for fuel cells described above. The evaluation step S20 first weighs out approximately 0.06 g of an electrode catalyst sample S of interest, which is to be fixed on the electrolyte membrane, and places the electrode catalyst sample S on the sample table 110 (sub-step S21). The electrode catalyst sample S tested here is produced by the electrode catalyst production process S1 through S4 and has carbon as the carrier with a predetermined quantity of an alloy of platinum Pt and iron Fe carried thereon.

After placing the produced electrode catalyst sample S on the sample table 110, the evaluation step S20 carries out pre-treatment to reduce and remove the gas adsorbed by the platinum-iron alloy (sub-step S22). This reduction process actuates the hydrogen gas supply unit 200 to make a flow of hydrogen gas at 80 through 200° C. for 15 minutes in the sample holder unit 100.

In general, the higher reduction temperature is preferable for the enhanced reduction reaction. For example, an evaluation test for an emission control catalyst that adsorbs carbon monoxide in exhaust gas carries out oxidation and reduction of a sample with gaseous oxygen and gaseous hydrogen at approximately 400° C. The procedure of the embodiment, however, carries out reduction of the electrode catalyst sample S with only gaseous hydrogen in a relatively low temperature range of about 80 to 200° C., in order to prevent sintering.

The sufficient progress of reduction in this temperature range was confirmed. It is assumed that one CO molecule is adsorbed relative to one metal atom appearing on the surface of the metal particle of the platinum-iron alloy. The particle diameter of the platinum particle is calculated from the quantity of adsorbed CO molecules (Ncc/g–Pt). In the case of insufficient reduction, all the metal atoms appearing on the surface of the metal particle are not active (do not have contribution to the reaction). The total quantity of the adsorbed CO molecules is accordingly decreased. The estimated number of metal atoms appearing on the surface of the metal particles in the case of insufficient reduction is thus smaller than that in the case of sufficient reduction. Although the actual number of metal atoms appearing on the surface of the metal particles is practically identical in both cases, the inactive metal atoms are regarded as absent. The particle diameter of the metal particle calculated from the quantity of adsorption of the CO molecules is accordingly greater than the actual particle diameter of the metal particle determined by, for example, X-ray diffraction (XRD). In the case of sufficient reduction, on the other hand, all the metal atoms appearing on the surface of the metal particle are active, and the number of metal atoms appearing on the surface of the metal particle is accurately estimated. The particle diameter of the metal particle calculated from the quantity of adsorption of the CO molecules is accordingly coincident with the actual particle diameter of the metal particle determined by X-ray diffraction. This procedure was adopted to confirm the sufficient progress of reduction in the above temperature range. The particle diameter of the metal particle determined by X-ray diffraction was about 2.6 nm.

After completion of the reduction with the hydrogen gas, the evaluation step S20 actuates the carbon monoxide gas supply unit 300 to introduce 100% carbon monoxide gas in a pulse-like form into the sample holder unit 100 (sub-step S23). In this embodiment, the quantity of carbon monoxide gas introduced each time is 1 cc, and the introduction is repeated six times. The total quantity of carbon monoxide gas introduced into the sample holder unit 100 is accordingly 6 cc. The computation unit 500 subtracts the quantity of carbon monoxide measured by the carbon monoxide gas detector unit 400 from the total quantity of carbon monoxide to determine the quantity of carbon monoxide adsorbed by the electrode catalyst sample S (sub-step S24).

This series of processing completes evaluation of the platinum-iron alloy catalyst. The process shifts to the decision step S27 to determine non-defective or defective of the electrode catalyst, based on the calculated quantity of adsorbed carbon monoxide. In this embodiment, the electrode catalyst having the calculated quantity of adsorbed carbon monoxide of not less than 14 Ncc/g is determined as non-defective. The quantity of adsorbed carbon monoxide is utilized for determination of non-defective or defective of the electrode catalyst, because of the following reasons.

Table 4 shows the observed quantity of adsorbed carbon monoxide and the observed value of IR compensation voltage Vi with regard to the platinum-iron alloy electrode catalysts produced. The IR compensation voltage Vi was measured in a unit cell with MEA of each electrode catalyst. The significant variation in quantity of adsorbed carbon monoxide in Table 4 is ascribed to a large variation in specific surface area of carbon. As mentioned previously, the adsorption of carbon monoxide is well correlated to the active rate of the platinum-iron alloy. Electrode catalysts produced from the carbon carrier of an identical specific surface area may have a variation in cell performances, due to the varying conditions of the producing process. In such cases, measurement of the quantity of adsorbed carbon monoxide is effective for accurate evaluation of the performance of the electrode catalyst.

TABLE 4

| Specific Surface Area | Quantity of Adsorbed Co | IR Compensation Voltage |
|---|---|---|
| 256 | 7 | 745 |
| 42 | 2 | 726 |
| 84 | 3 | 740 |
| 62 | 4 | 732 |
| 242 | 10 | 743 |
| 77 | 6 | 742 |
| 800 | 14 | 785 |
| 1000 | 19.3 | 805 |

TABLE 4-continued

| Specific Surface Area | Quantity of Adsorbed Co | IR Compensation Voltage |
|---|---|---|
| 1250 | 18.7 | 810 |
| 1270 | 16.1 | 785 |

Figure 9:
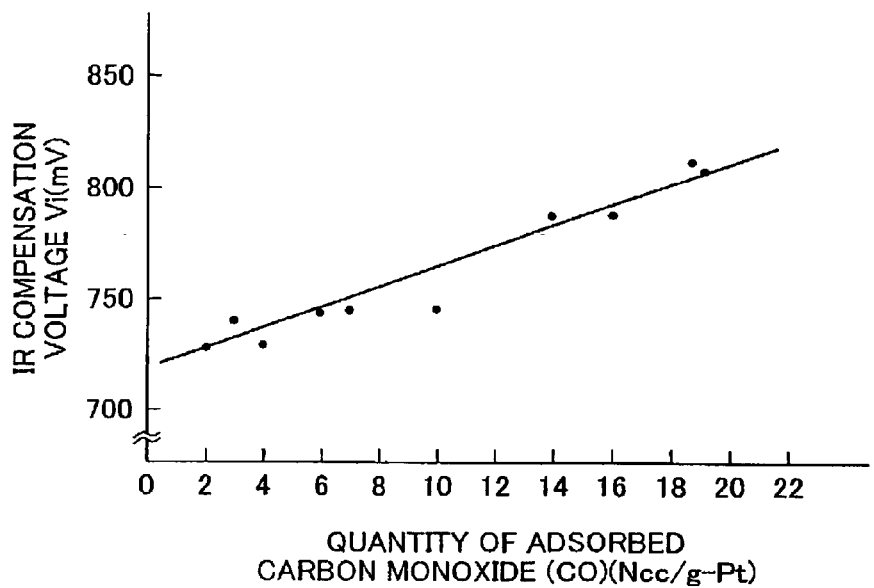
FIG. 9 is a graph showing the IR compensation voltage Vi plotted against the quantity of adsorbed carbon monoxide.

The results of Table 4 are plotted in the graph of FIG. 9. As clearly understood from the graph of FIG. 9, the IR compensation voltage Vi of the fuel cell is proportional to the quantity of carbon monoxide adsorbed by the electrode catalyst. Namely the IR compensation voltage Vi increases with an increase in quantity of carbon monoxide adsorbed by the electrode catalyst. The relationship between the IR compensation voltage and the quantity of adsorbed carbon monoxide is approximate to a linear function. Measurement of the quantity of carbon monoxide adsorbed by the electrode catalyst accordingly determines the expected IR compensation voltage of the resulting fuel cell and thus enables evaluation of the performance of the resulting fuel cell.

As described above, the evaluation method of the second embodiment evaluates the powdery form of each electrode catalyst as the sample and thereby estimates the properties of a resulting fuel cell including the electrode catalyst. This evaluation method does not require fixation of the electrode catalyst to the electrolyte membrane nor production of a unit fuel cell. The cell performance of a unit cell or a stack of fuel cells is estimated by simply measuring the quantity of carbon monoxide adsorbed by the powdery form of electrode catalyst. This arrangement significantly simplifies the series of evaluation process, compared with the conventional evaluation method that requires fixation of the electrode catalyst to the electrolyte membrane and formation of the MEA.

The evaluation method of the embodiment specifies the specific surface area of the electrode catalyst and estimates the performance of the fuel cell including the electrode catalyst, based on the quantity of carbon monoxide adsorbed by the electrode catalyst. Unlike the prior art electrochemical evaluation method that supplies electricity to the electrode catalyst for measurement of the electric current, this evaluation method based on the quantity of adsorbed carbon monoxide desirably shortens the total measurement time and advantageously simplifies the measurement procedure. In the evaluation method of the embodiment, carbon monoxide gas is used as the single-composition gas. The single-composition gas is, however, not restricted to carbon monoxide gas, but may be carbon dioxide gas, hydrogen gas, or oxygen gas. When hydrogen gas is applied for the single-composition gas, while the temperature of the hydrogen gas is regulated, the reduction and removal sub-step and the adsorption quantity measurement sub-step are carried out individually.

Compared with the CV method, which is the electrochemical evaluation method, the evaluation method of the embodiment based on the quantity of adsorbed carbon monoxide ensures more accurate evaluation of the performance of the fuel cell (electrode catalyst). The evaluation method of the embodiment does not require the catalyst sample to be coated with the electrolyte for the sufficient electrical conductivity. This method thus significantly reduces or even eliminates the fraction of the catalyst having no contribution to the actual catalytic reaction.

The producing method of the second embodiment including the above evaluation process produces the platinum-iron alloy electrode catalyst, evaluates the performance of the electrode catalyst prior to production of an electrode, and manufactures a unit cell and thereby a fuel cell stack using the evaluated electrode catalyst having the excellent properties. This leads to little variation in performance among the respective unit cells and enables manufacture of a high-performance fuel cell stack. The performance of the fuel cell can be evaluated without actual production of an electrode on the electrolyte membrane. This arrangement simplifies the whole series of manufacturing process and effectively prevents production of defective MEAs having insufficient performances. This arrangement is thus advantageous for resource saving. One possible application classifies electrode catalysts into multiple grades based on the quantity of adsorbed carbon monoxide and selects an electrode catalyst of the suitable grade for manufacture of the MEA and assembly of the fuel cell stack.

The evaluation step S20 for the electrode catalyst in the manufacturing process of the second embodiment may be modified in various ways. Four modified procedures of the evaluation step S20 are discussed below:

(1) Evaluation by EDX Analysis
(2) Evaluation by EXAFS analysis
(3) Evaluation based on Temperature of Complete Oxygen Release
(4) Evaluation based on Peak Temperature of Carbon Dioxide Release (1) Evaluation by EDX Analysis The first modified procedure of the evaluation step S20 adopts EDX analysis for evaluation of the electrode catalyst. The EDX analysis represents energy dispersive X-ray analysis, which makes the powdery platinum-iron alloy catalyst obtained by the production process S1 through S4 exposed to an electron beam and analyzes the X-ray spectrum generated by the interaction of the electron beam with the constituent atoms of the powdery catalyst. The analysis specifies the ratio of iron to platinum included in the respective catalyst particles of the powdery electrode catalyst. The ratio of the number of the base metal atoms to the number of the noble metal atoms in the catalyst particle determined by this technique is different from the simple atomic ratio or weight ratio of the base metal to the noble metal as the total quantity carried on the carrier. The electrode catalyst having the atomic number ratio equal to or greater than the specified value ensures the enhanced catalytic function of the noble metal and exerts the excellent activity as the electrode catalyst for fuel cells. The EDX analysis adopted in the first modified procedure used VOYAGER (NORAN) as an analyzing device and applied an accelerating voltage of 200 kv and a beam diameter of 2 nanometer as analyzing conditions.

Figure 10:
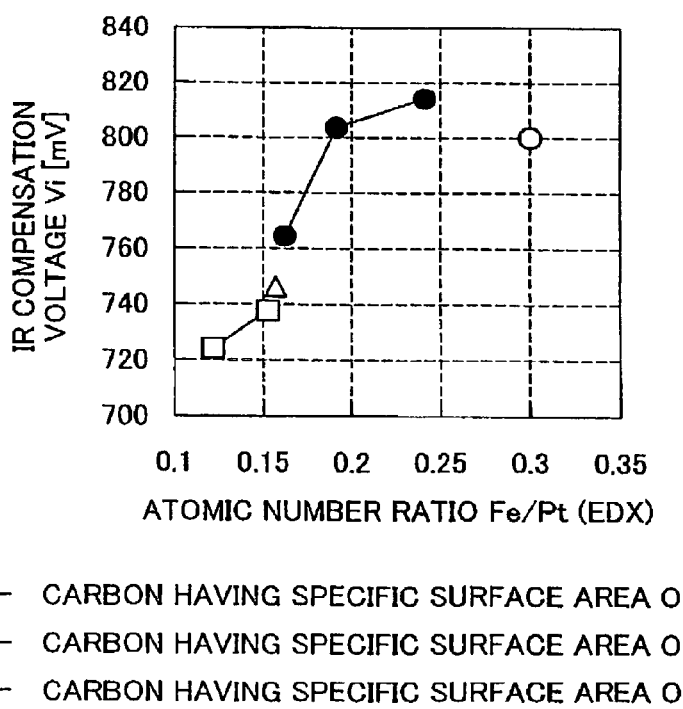
FIG. 10 is a graph showing the IR compensation voltage Vi plotted against the atomic number ratio of Fe to Pt by EDX analysis.

After the evaluation by the EDX analysis, the decision step S27 is carried out to determine defective or non-defective based on the results of the evaluation. In this modified procedure, the electrode catalyst having the Fe/Pt atomic number ratio of not less than 0.14 by the EDX analysis was determined as non-defective. The data of Table 2 and other experimental data are plotted in the graph of FIG. 10. The atomic number ratio of iron to platinum by the EDX analysis, that is, Fe/Pt, of not less than 0.14 gives the IR compensation voltage of not lower than 740 millivolts in the resulting fuel cell. The electrode catalyst having the atomic number ratio equal to or greater than this specified value (0.14) by the EDX analysis exerts the excellent activity as the electrode catalyst for fuel cells. The re is a tendency that the higher ratio of the number of iron atoms to the number of platinum atoms by the EDX analysis results in the higher IR compensation voltage of the resulting fuel cell. One possible application classifies electrode catalysts into multiple grades based on the atomic number ratio and selects an electrode catalyst of the suitable grade for manufacture of the MEA and assembly of a fuel cell stack.

(2) Evaluation by EXAFS Analysis

The second modified procedure of the evaluation step S20 adopts EXAFS analysis for evaluation of the electrode catalyst. The EXAFS analysis makes the sample exposed to X ray with varying frequency and specifies the arrangement in the nanometer order based on the fine structure appearing on the resulting absorption spectrum. In the electrode catalyst exposed to X ray, specific inner-shell electrons of target platinum atom are excited according to the wavelength of exposure and are flown out as photoelectrons. The photoelectrons are scattered in the presence of iron atom close to the target platinum atom. The scattering is observed as the fine structure of the absorption spectrum. Analysis of the fine structure of the absorption spectrum gives information regarding a base metal atom, such as iron, present in the vicinity of the target platinum atom (for example, identification of the base metal atom and its distance). The ratio of the binding number of the noble metal atom with the base metal atom to the total binding number of the noble metal atom determined by this technique shows the atomic arrangement of the alloy and is different from the simple atomic ratio or weight ratio. The electrode catalyst having the ratio of the atom binding number equal to or greater than the specified value ensures the enhanced catalytic function of the noble metal and exerts the excellent activity as the electrode catalyst for fuel cells.

The EXAFS analysis adopted in the second modified procedure used Photon Factory Beam Line 9A (2.5 GeV, storage ring), KEK (High Energy Accelerator Research Organization), Ministry of Education, Culture, Sports, Science, and Technology. The optical spectrometer used was an Si double crystal monochrometer. Iron and Platinum were respectively divided into three or four blocks. Iron was measured while the energy was gradually increased by the minimum step width of 1 eV from the minimum 6800 eV to the maximum 8000 eV. Platinum was measured, on the other hand, while the energy was gradually increased by the minimum step width of 1 eV from the minimum 11,000 eV to the maximum 12,500 eV.

Figure 11:
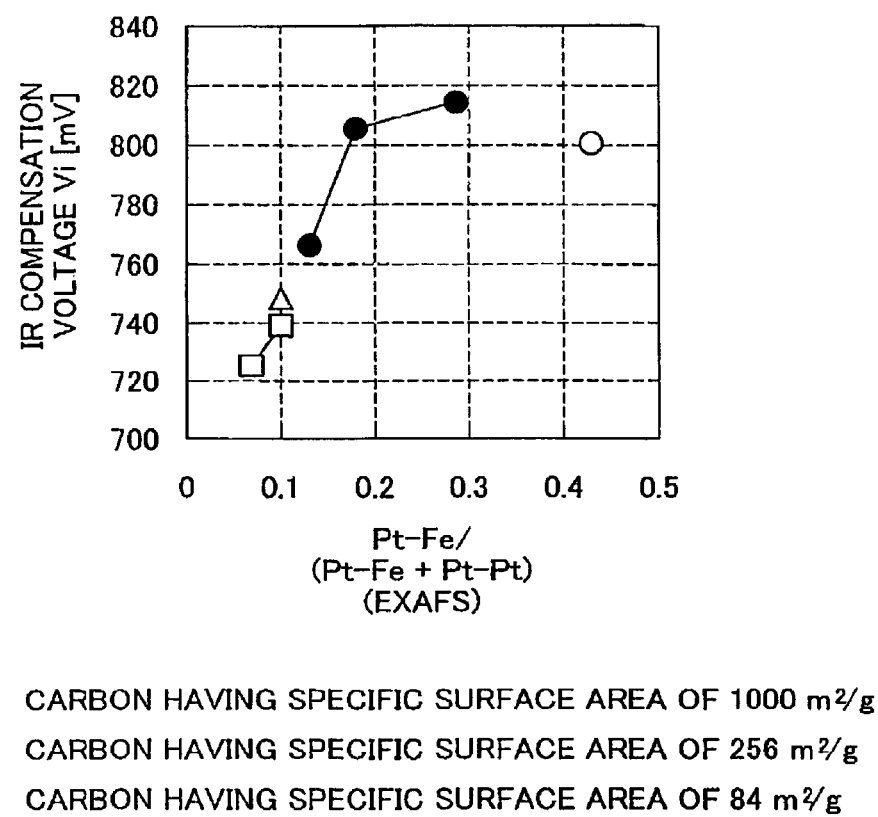
FIG. 11 is a graph showing the IR compensation voltage Vi plotted against the ratio of binding number by EXAFS analysis.

After the evaluation by the EXAFS analysis, the decision step S27 is carried out to determine defective or non-defective based on the results of the evaluation. In this modified procedure, the electrode catalyst having the value (Fe—Pt)/{(Fe—Pt)+(Pt—Pt)} of not less than 0.10 by the EXAFS analysis was determined as non-defective. The data of Table 3 and other experimental data are plotted in the graph of FIG. 11. The ratio of the binding number of platinum atom with iron atom to the total binding number of platinum atom by the EXAFS analysis of not less than 0.10 gives the IR compensation voltage of not lower than 740 millivolts in the resulting fuel cell. The electrode catalyst having the binding number ratio equal to or greater than this specified value (0.10) by the EXAFS analysis exerts the excellent activity as the electrode catalyst for fuel cells. There is a tendency that the higher binding number ratio by the EXAFS analysis results in the higher IR compensation voltage of the resulting fuel cell. One possible application classifies electrode catalysts into multiple grades based on the binding number ratio by the EXAFS analysis and selects an electrode catalyst of the suitable grade for manufacture of the MEA and assembly of a fuel cell stack.

(3) Evaluation Based on Temperature of Complete Oxygen Release

Figure 12:
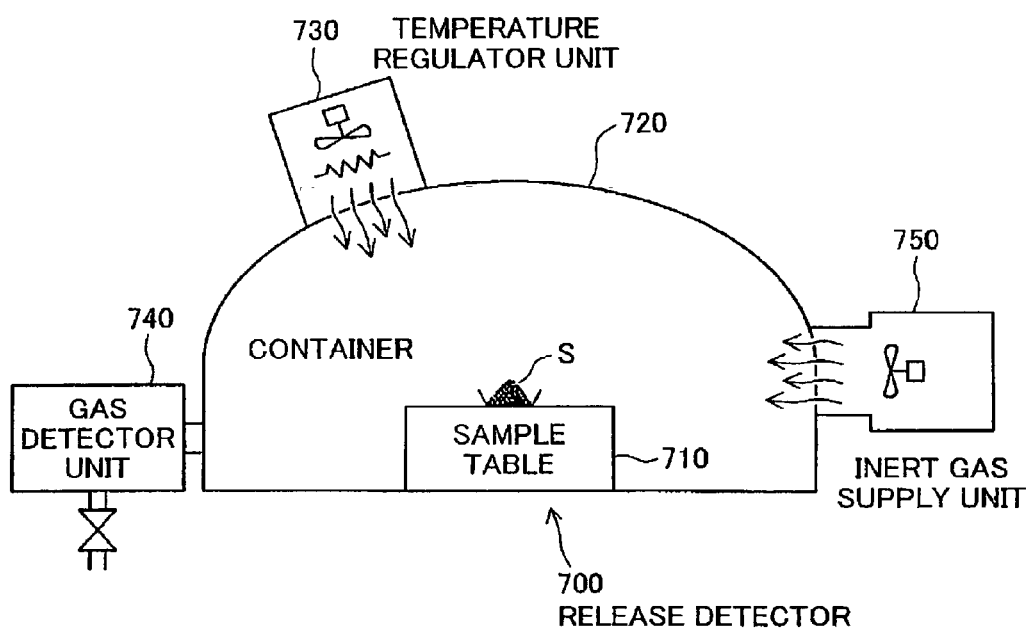
FIG. 12 schematically illustrates the structure of a release detector used in a modified procedure of the second embodiment.
Figure 13:
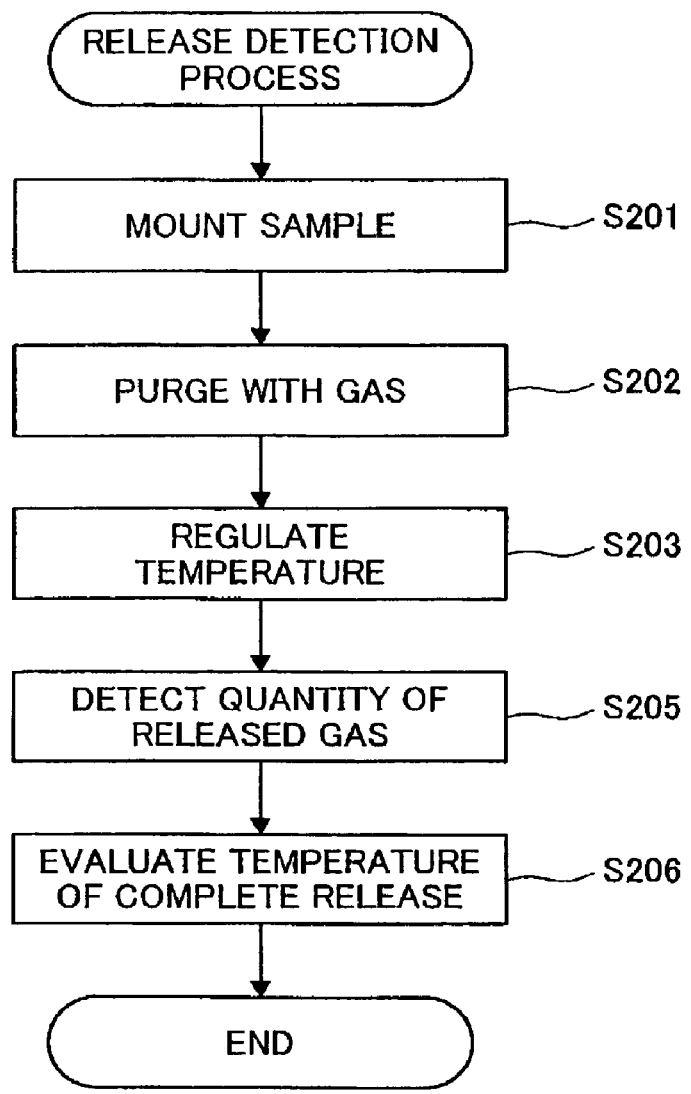
FIG. 13 is a flowchart showing a process of evaluation the electrode catalyst based on the observed release temperature.

The third modified procedure of the evaluation step S20 places the powdery electrode catalyst produced by the production process S1 through S4 in a release detector 700 shown in FIG. 12 to measure the temperature of complete gas release. The release detector 700 includes a sample table 710 on which a powdery electrode catalyst sample S is mounted, a container 720 that contains the sample table 710 in an air-tight manner, a temperature regulator unit 730 that regulates the temperature in the container 720 with time, a gas detector unit 740 that detects the released gas, and an inert gas supply unit 750 that fills the container 720 with an inert gas (for example, helium gas) and continuously supplies the inert gas to the container 720. As shown in the flowchart of FIG. 13, the third modified procedure of the evaluation step S20 first places a predetermined quantity of a powdery electrode catalyst sample on the sample table 710 in the container 720 (step S201), and supplies helium gas to the container 720 to purge the inside of the container 720 with the supplied helium gas (step S202). The procedure actuates the temperature regulator unit 730 to regulate the internal temperature of the container 720 according to a temperature profile shown in FIG. 14 (step S203), while ensuring continuous supply of the helium gas.

Figure 14:
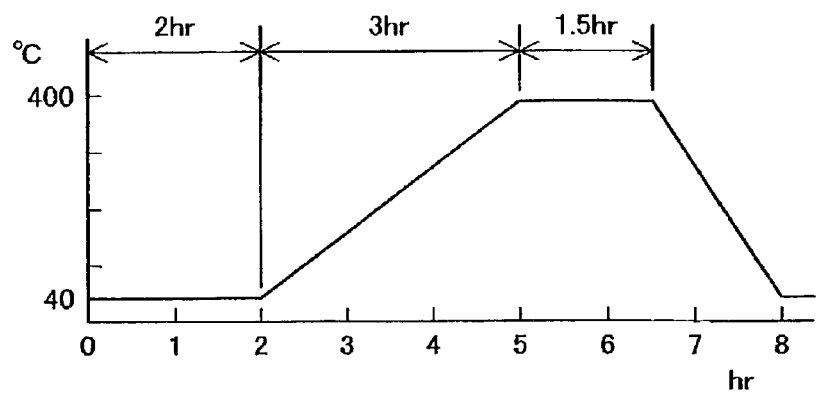
FIG. 14 is a graph showing an exemplified profile of temperature variation used in measurement of the release temperature.

The procedure actuates the gas detector unit 740 to measure the quantity of the gas released from the powdery electrode catalyst (step S205) while regulating the temperature in the container 720 according to the temperature profile of FIG. 14. The procedure subsequently evaluates the complete gas release temperature based on the observed quantity of the released gas (step S206). In this modified procedure, the detected gas is oxygen gas. Oxygen gas is released from the electrode catalyst with an increase in temperature, and oxygen release is completed at a specific temperature. The complete gas release temperature represents a temperature at which the variation in quantity of released gas falls within 10% under the condition of a temperature increase in the container 720 by 10° C. The observed quantities of released oxygen gas with regard to multiple electrode catalysts are shown in Table 5. Table 5 also shows data of carbon dioxide release peak temperature discussed below as the modified procedure 4.

TABLE 5

| Sample No. | *TC | *PT | *IR | (unit: mV) |
|---|---|---|---|---|
| 1 | 271 | 292 | 765 | |
| 2 | 217 | 260 | 794 | |
| 3 | 155 | 165 | 808 | |
| 4 | 142 | 147 | 805 | |

Figure 15:
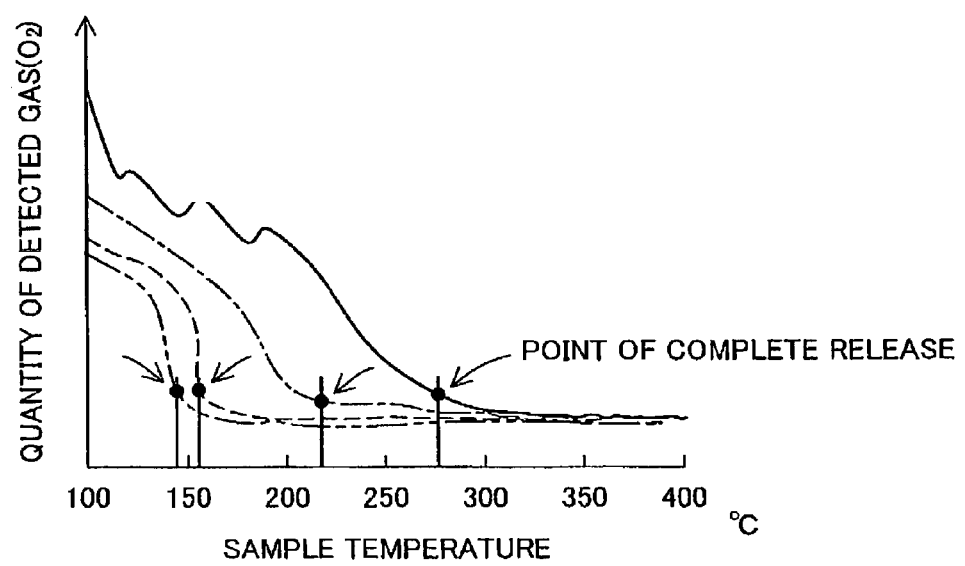
FIG. 15 is a graph showing the quantity of released oxygen plotted against the sample temperature with regard to multiple samples.
Figure 16:
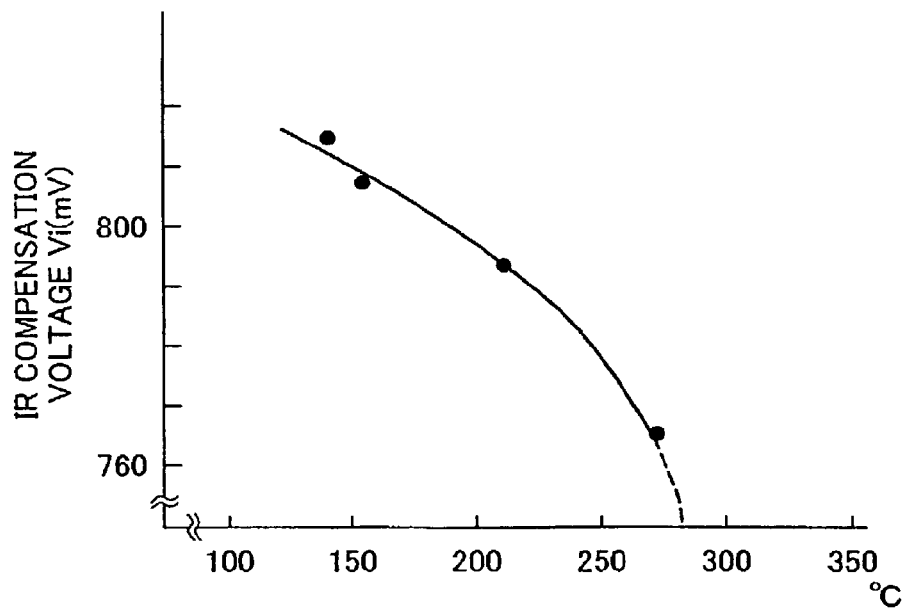
FIG. 16 is a graph showing the relationship between the temperature of complete oxygen release from each electrode catalyst and the IR compensation voltage Vi in each fuel cell including the electrode catalyst.

*TC: Temperature of Complete Oxygen Release
*PK: Peak Temperature of Carbon Dioxide Release
*IR: IR Compensation Voltage The data of Table 5 are plotted in the graph of FIG. 15, the quantity of detected gas ($O_2$) as ordinate and the sample temperature as abscissa. The gas detector unit 740 used to measure the quantity of the released gas is a GC-MS that applies an electric charge to a specific gas and measures the quantity of the gas real time. FIG. 16 is a graph showing the relationship between the temperature of complete oxygen release from each electrode catalyst and the IR compensation voltage in each fuel cell including the electrode catalyst.

After the evaluation of the complete oxygen release temperature of the electrode catalyst produced by the production process S1 through S4, the decision step S27 is carried out to determine defective or non-defective based on the results of the evaluation. In this modified procedure, the electrode catalyst having the complete oxygen release temperature of not higher than 280° C. was determined as non-defective and fed to the subsequent fuel cell assembly process. The electrode catalyst having the complete oxygen release temperature of not higher than 280° C. was determined as non-defective, because of the following reason. As seen in the graph of FIG. 16 showing the relationship between the complete oxygen release temperature of each electrode catalyst and the IR compensation voltage Vi in the fuel cell including the electrode catalyst, the fuel cell including the electrode catalyst having the complete oxygen release temperature of not higher than 280° C. gives the IR compensation voltage of not lower than 760 millivolts.

The third modified procedure measures the complete oxygen release temperature at the evaluation step S20 and determines defective or non-defective of the electrode catalyst based on the observed complete oxygen release temperature at the decision step S27. The electrode catalyst having the complete oxygen release temperature of not higher than 280° C. is used as the non-defective for production of an MEA. The electrode catalyst satisfying this condition gives little variation in performance of the MEA and ensures the favorable performance of a unit cell and a resulting fuel cell stack. There is a tendency that the lower complete oxygen release temperature results in the higher IR compensation voltage of the resulting fuel cell. One possible application classifies electrode catalysts into multiple grades based on the complete oxygen release temperature and selects an electrode catalyst of the suitable grade for manufacture of the MEA and assembly of a fuel cell stack.

(4) Evaluation Based on Peak Temperature of Carbon Dioxide Release

The fourth modified procedure of the evaluation step S20 places the powdery electrode catalyst produced by the production process S1 through S4 in the release detector 700 shown in FIG. 12 to measure the peak temperature of gas release. The release detector 700 is identical with that used in the third modified procedure for measuring the complete gas release temperature, and the gas detector unit 740 detects the quantity of carbon dioxide, instead of the quantity of oxygen. The fourth modified procedure of the evaluation step S20 also follows the flowchart of FIG. 13, except measurement of the peak temperature of carbon dioxide release. The procedure first places a predetermined quantity of a powdery electrode catalyst sample on the sample table 710 in the container 720 (step S201), and supplies helium gas to the container 720 to purge the inside of the container 720 with the supplied helium gas (step S202). The procedure actuates the temperature regulator unit 730 to regulate the internal temperature of the container 720 according to the temperature profile shown in FIG. 14 (step S203), while ensuring continuous supply of the helium gas.

Figure 17:
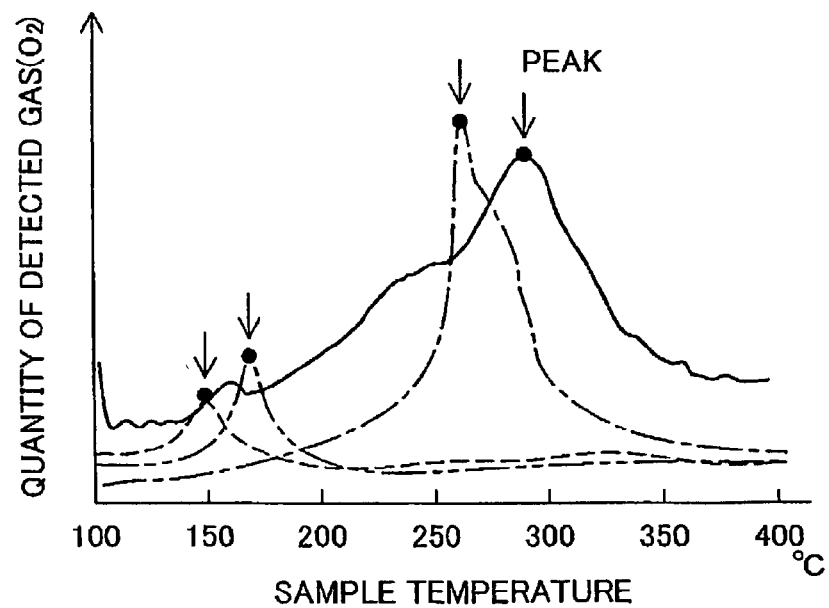
FIG. 17 is a graph showing the quantity of released carbon dioxide plotted against the sample temperature with regard to multiple samples.

The procedure actuates the gas detector unit 740 to measure the quantity of the gas released from the powdery electrode catalyst (step S205) while regulating the temperature in the container 720 according to the temperature profile of FIG. 14. The procedure subsequently evaluates the gas release peak temperature based on the observed quantity of the released gas (step S206). In this modified procedure, the detected gas is carbon dioxide gas. Carbon dioxide gas is released from the electrode catalyst with an increase in temperature, and release of the gas is most vigorous at a specific peak temperature. The gas release peak temperature represents a sampling temperature at which the quantity of gas release reaches its maximum under the condition of a gradual temperature increase in the container 720. The observed peak temperatures are shown in the graph of FIG. 17. The observed carbon dioxide gas release of each electrode catalyst has a clear peak. The observed peak temperatures are also shown in Table 5 as mentioned previously.

Figure 18:
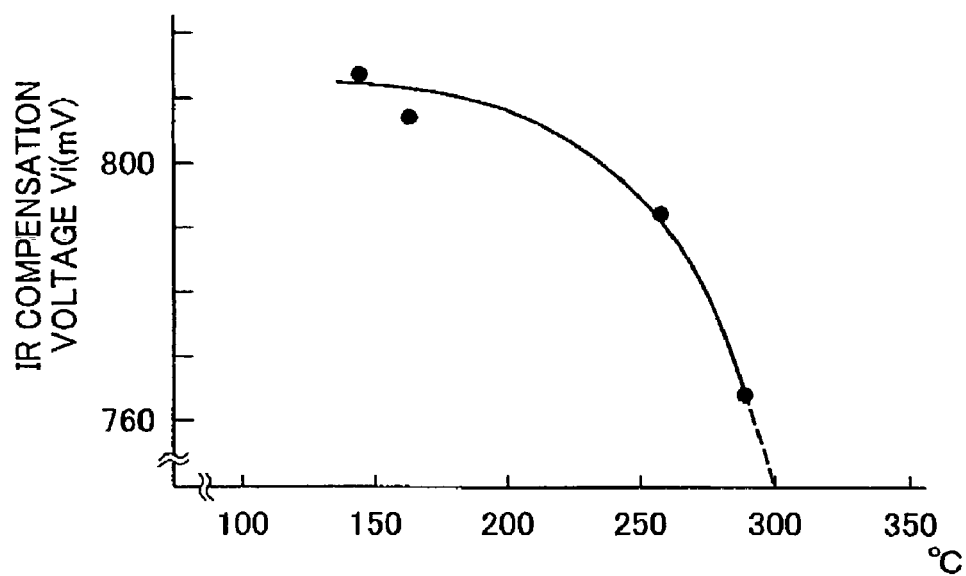
FIG. 18 is a graph showing the relationship between the peak temperature of carbon dioxide release from each electrode catalyst and the IR compensation voltage Vi in each fuel cell including the electrode catalyst.

After the evaluation of the carbon dioxide release peak temperature of the electrode catalyst produced by the production process S1 through S4, the decision step S27 is carried out to determine defective or non-defective based on the results of the evaluation. In this modified procedure, the electrode catalyst having the carbon dioxide release peak temperature of not higher than 300° C. was determined as non-defective and fed to the subsequent fuel cell assembly process. The electrode catalyst having the carbon dioxide release peak temperature of not higher than 300° C. was determined as non-defective, because of the following reason. As seen in the graph of FIG. 18 showing the relationship between the carbon dioxide release peak temperature of each electrode catalyst and the IR compensation voltage Vi in the fuel cell including the electrode catalyst, the fuel cell including the electrode catalyst having the carbon dioxide release peak temperature of not higher than 300° C. gives the IR compensation voltage of not lower than 760 millivolts.

The fourth modified procedure measures the peak temperature of carbon dioxide release at the evaluation step S20 and determines defective or non-defective of the electrode catalyst based on the observed peak temperature at the decision step S27. The electrode catalyst having the $CO_2$ release peak temperature of not higher than 300° C. is used as the non-defective for production of an MEA. The electrode catalyst satisfying this condition gives little variation in performance of the MEA and ensures the favorable performance of a unit cell and a resulting fuel cell stack. There is a tendency that the lower peak temperature of carbon dioxide release results in the higher IR compensation voltage of the resulting fuel cell. One possible application classifies electrode catalysts into multiple grades based on the observed $CO_2$ release peak temperature and selects an electrode catalyst of the suitable grade for manufacture of the MEA and assembly of the fuel cell stack.

In the above description of the first and the second embodiments and the four modified procedures for evaluation of the electrode catalyst, the support density of the platinum-iron alloy in the electrode catalyst is not specifically mentioned. The support density of the platinum-iron alloy on the carbon carrier is selectable in an adequate range by taking into account the required performances of the fuel cell. The platinum-iron alloy catalyst produced in the embodiment has the support density that is adjustable in the wide range of 15 to 70% as shown in FIG. 5. The support density of the electrode catalyst is regulated to an optimum level by taking into account various parameters of the resulting fuel cell affected by the support density, such as the water content. The wide range of the support density giving the practical IR compensation voltage is advantageous in design of the fuel cell.

In the second embodiment discussed above, the evaluation step of the electrode catalyst is part of the manufacturing process of the fuel cell stack. Evaluation of the electrode catalyst may, however, be carried out alone. The evaluation method of the embodiment enables evaluation of the performance of the noble metal-base metal alloy electrode catalyst without manufacturing the MEA, the unit cell, or the fuel cell stack, thus significantly shortening the time required for development of the electrode catalyst. Such evaluation carried out alone or in combination in the process of screening various combinations of diverse metals at the initial stage of development of a novel alloy catalyst desirably reduces the labor and time for evaluating the various combinations.

The electrode catalyst included in the fuel cell may be a platinum catalyst. The platinum catalyst is produced according to the production process of the platinum-iron alloy catalyst of the first embodiment shown in the flowchart of FIG. 1 except the iron supporting step S3. The carbon black used as the carrier had the specific surface area in a range of 600 to 800 m$^2$/g. The platinum catalyst produced through the production steps S1, S2, and S4 was used to manufacture an MEA, a unit cell, and finally a fuel cell stack. The resulting fuel cell stack had the IR compensation voltage Vi of not lower than 740 millivolts, which ensures the favorable performance of the fuel cell. The fuel cell including the platinum catalyst composed of platinum alone has the favorable property, as long as the carbon carrier has the specific surface area of not less than 600 m$^2$/g and less than 1000 m$^2$/g. The platinum electrode catalyst was evaluated by the quantity of adsorbed carbon monoxide, the temperature of complete oxygen release, and the peak temperature of carbon dioxide release discussed previously as the modified procedures of the second embodiment.

The evaluation apparatus for fuel cells in the second embodiment shown in FIG. 7 determines the quantity of carbon monoxide adsorbed by the electrode catalyst. The evaluation apparatus may be used to determine the specific surface area of the electrode catalyst. The computation unit 500 calculates the specific surface area of the electrode catalyst from the observed quantity of adsorbed carbon monoxide, based on a relationship between the quantity of carbon monoxide adsorbed by the electrode catalyst and the specific surface area of the electrode catalyst. In general, the cell performance is improved with an increase in specific surface area of the electrode catalyst. The specific surface area determined by the computation unit 500 can thus be utilized as the indication of screening of the electrode catalyst.

The above embodiments and their modifications and applications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The above embodiments regard the alloy electrode catalyst including one noble metal and one base metal. The electrode catalyst may include a ternary alloy as a combination of two noble metals and one base metal or a combination of one noble metal and two base metals, or even a quaternary or hypercomplex alloy as a combination of two or a greater number noble metals and two or a greater number of base metals. The evaluation method and the manufacturing method discussed above are applicable to such ternary, quaternary, and hypercomplex alloy electrode catalysts. In the above embodiments, the electrode catalyst prior to fixation to the electrolyte membrane is used as the sample. The sample may alter natively be the electrode catalyst fixed to the electrolyte membrane (MEA). The procedure in the latter case requires additional fixation of a desired quantity of the electrode catalyst to the electrolyte membrane. This procedure, however, enables measurement of the specific surface area of the electrode catalyst and evaluation of the performances of the fuel cell in the actual application of the electrode catalyst.

The scope and spirit of the present invention are indicated by the appended claims, rather than by the foregoing description.

What is claimed is:

1. An electrode catalyst for a fuel cell, said electrode catalyst comprising an alloy of a noble metal and a base metal carried on a carbon carrier,
   wherein an atomic number ratio of the base metal to the noble metal is not less than 0.14 in EDX analysis, and
   wherein a ratio of a binding number of noble metal atom with base metal atom to a total binding number relating to the noble metal atom is not less than 0.10 in EXAFS analysis.

2. The electrode catalyst in accordance with claim 1,
   wherein a temperature of complete oxygen release from a powdery form of catalyst prior to production of an electrode is not higher than 280° C.

3. The electrode catalyst in accordance with claim 1,
   wherein a peak temperature of carbon dioxide release from a powdery form of catalyst prior to production of an electrode is not higher than 300° C.

4. The electrode catalyst in accordance with claim 1,
   wherein a quantity of adsorbed carbon monoxide in a powdery form of catalyst prior to production of an electrode is not less than 12 Ncc per gram of noble metal.

5. An electrode catalyst in accordance with claim 1,
   wherein the noble metal is platinum and the base metal is iron.

6. An electrolyte membrane for a fuel cell, which is integrally formed with an electrode catalyst, said electrode catalyst comprising an alloy of a noble metal and a base metal carried on a carbon carrier, wherein an atomic number ratio of the base metal to the noble metal is not less than 0.14 in EDX analysis, and wherein a ratio of a binding number of noble metal atom with base metal atom to a total binding number relating to the noble metal atom is not less than 0.10 in EXAFS analysis.

7. A fuel cell comprising an electrolyte membrane integrally formed with an electrode catalyst, said electrode catalyst comprising an alloy of a noble metal and a base metal carried on a carbon carrier, wherein an atomic number ratio of the base metal to the noble metal is not less than 0.14 in EDX analysis, and wherein a ratio of a binding number of noble metal atom with base metal atom to a total binding number relating to the noble metal atom is not less than 0.10 in EXAFS analysis.

* * * * *